United States Patent
Suzuki et al.

(10) Patent No.: US 7,908,447 B2
(45) Date of Patent: Mar. 15, 2011

(54) STORAGE APPARATUS AND VOLUME RESTORATION METHOD

(75) Inventors: Hidenori Suzuki, Atami (JP); Shunji Kawamura, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 576 days.

(21) Appl. No.: 11/968,277

(22) Filed: Jan. 2, 2008

(65) Prior Publication Data
US 2009/0254721 A1  Oct. 8, 2009

(30) Foreign Application Priority Data
Apr. 2, 2007  (JP) .................................. 2007-096931

(51) Int. Cl.
*G06F 12/16* (2006.01)
(52) U.S. Cl. .......................... 711/162; 711/114; 711/161
(58) Field of Classification Search .................... None
See application file for complete search history.

(56) References Cited

U.S. PATENT DOCUMENTS

| 7,350,043 | B2 * | 3/2008 | Andre et al. .................. 711/162 |
| 7,788,532 | B2 * | 8/2010 | Kawamura ....................... 714/15 |
| 2005/0027819 | A1 | 2/2005 | Nakano et al. |
| 2005/0028022 | A1 * | 2/2005 | Amano .............................. 714/2 |
| 2005/0188256 | A1 * | 8/2005 | Stager et al. .................... 714/13 |
| 2009/0313503 | A1 * | 12/2009 | Atluri et al. ..................... 714/19 |
| 2010/0077173 | A1 * | 3/2010 | Rao et al. ....................... 711/170 |

FOREIGN PATENT DOCUMENTS
JP    2004-342050    12/2004

* cited by examiner

*Primary Examiner* — Than Nguyen
(74) *Attorney, Agent, or Firm* — Brundidge & Stanger, P.C.

(57) ABSTRACT

A storage apparatus conducts, in a protection period, data protection processing for protecting, in a third logical volume, data stored in a first logical volume by using backup data stored in a second logical volume, and suspends the data protection processing in a no-protection period, during which backup relative to the second logical volume is suspended, in the protection period. Then, upon receiving an external order for restoring the first logical volume to its state as of at a time not in the no-protection period within the protection period, the storage apparatus restores the first logical volume to its state as of at a time of the order by using the data backed up in the second logical volume and the data protected in the third logical volume.

10 Claims, 30 Drawing Sheets

|  |  |  |
|---|---|---|
| 1011A | STATE | 0 |
| 1011B | PROTECTION PERIOD |  |
| 1011C | RESTORATION ORDER TIME |  |

FIG.7

| | | 1012C | 1012D | 1012E | 1012F |
|---|---|---|---|---|---|
| 1012A | STATE | 0 | | | |
| 1012B | ID | DAY | MONTH | START TIME | FINISH TIME |
| | 0 | | | 0:00 | 6:00 |
| | 1 | 0 | | 0:00 | 0:00 |
| | | | | | |
| | | | | | |
| | | | | | |

SPECIFICATION OF PROTECTION PERIOD

SPECIFICATION OF PROTECTION PERIOD
- ● HOURS
- ○ DAYS

SPECIFICATION OF NO-PROTECTION PERIOD
- ● EVERY DAY: [ ]HOUR[ ]MINUTE ~ [ ]HOUR[ ]MINUTE
- ○ EVERY WEEK: [ ]DAY [ ]HOUR[ ]MINUTE ~ [ ]HOUR[ ]MINUTE
- ○ EVERY MONTH: [ ]DATE [ ]HOUR[ ]MINUTE ~ [ ]HOUR[ ]MINUTE

NO-PROTECTION PERIOD LIST
EVERY DAY:0:00~6:00
EVERY WEEK : SUNDAY 0:00~0:00

[>>] 17
[<<] 18

[OK] 15  [Cancel] 16

12, 13, 14, 19

| T1 | T11 | T12 | T13 | T14 |
|---|---|---|---|---|
| | 1ST SECTION | 2ND SECTION | 3RD SECTION | 4TH SECTION |
| DIFFERENCE START TIME | 5:00:00.000 | 6:00:00.000 | 7:00:00.000 | 8:00:00.000 |
| DIFFERENCE FINISH TIME | 5:59:59.999 | 6:59:59.999 | 7:59:59.999 | 8:30:00.000 |

| TIME FOR CDP B-Vol | 4:59:59.999 |
|---|---|

T2

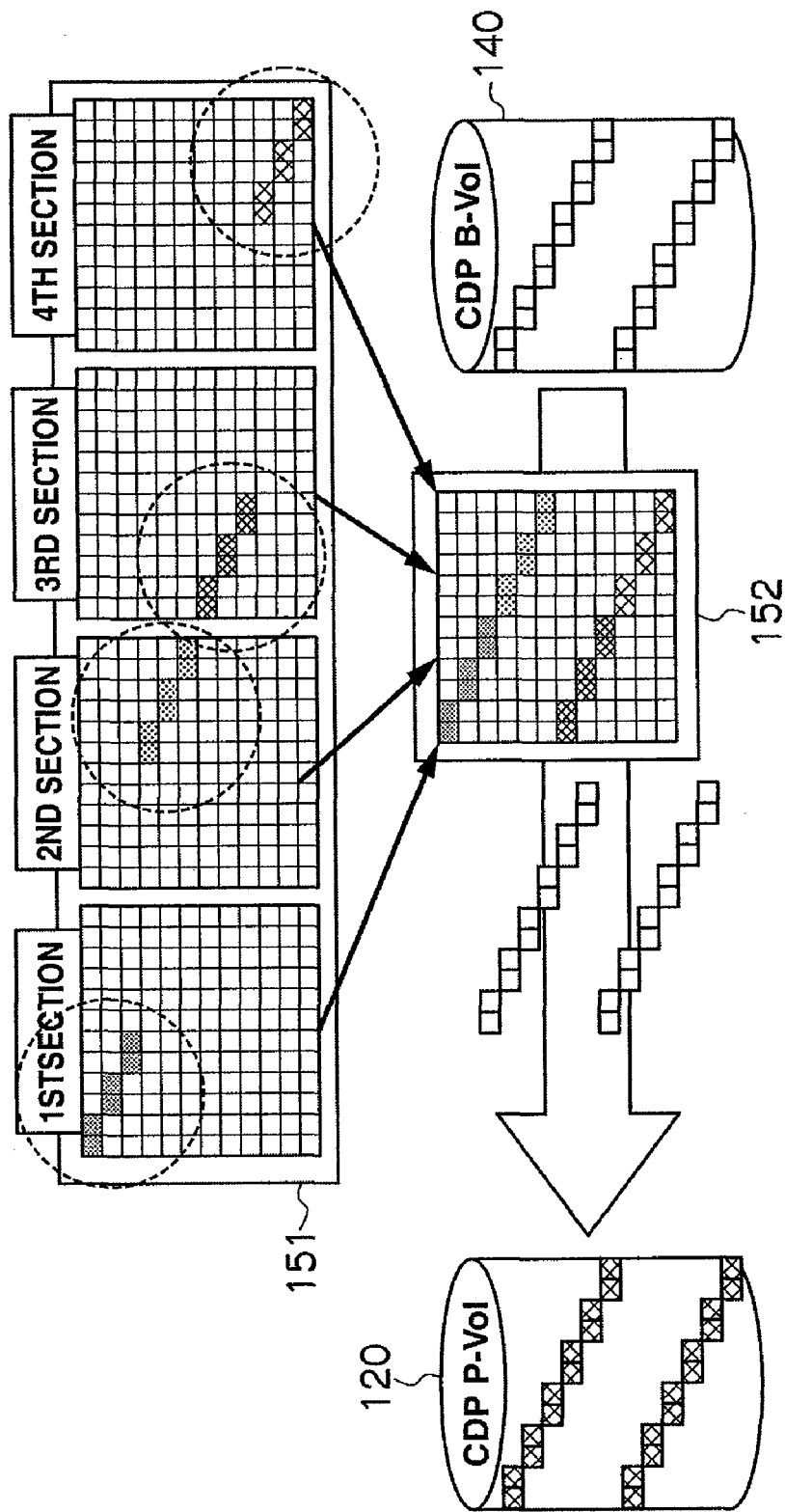

STORAGE APPARATUS AND VOLUME RESTORATION METHOD

CROSS-REFERENCES TO RELATED APPLICATIONS

This application relates to and claims priority from Japanese Patent Application No. 2007-096931, filed on Apr. 2, 2007, the entire disclosure of which is incorporated herein by reference.

BACKGROUND

1. Field of the Invention

The invention relates generally to a storage apparatus and a volume restoration method, and is suitable for use in, for example, a data restoration method based on storage apparatus CDP (Continuous Data Protection) processing in the storage apparatus.

2. Description of Related Art

CDP is a technique of restoring a volume in a storage apparatus. CDP is a technique in which a host connected to a storage apparatus is not used, writing to a volume targeted for data protection is stored as update history only in the storage apparatus, and an image from a given past point in time can be restored. In CDP, a user sets an arbitrary protection period in advance, thereby enabling restoration of an image from an arbitrary point in time within the range of the protection period. The arbitrary point in time can be specified by a user by time specification, marker specification, etc.

A known technique of acquiring a snapshot in a volume from a certain point in time is known (see, e.g., JP2004-342050 A).

In performing CDP, a storage apparatus stores all write data. As a result, write data is stored even during a time period in which data restoration is unnecessary. Accordingly, there has been a problem in that storing unnecessary write data leads to enormous amounts of data in a volume, and enormous amounts of data invite a longer volume restoration time.

There are other data copy techniques, including a remote copy technique for conducting data copy between plural storage apparatuses, a local copy technique for conducting data copy between plural volumes in a single storage apparatus, and a snapshot technique for preserving data at a certain point in time. In the remote copy and local copy techniques, a volume can be restored to its most recent state, but not to a past state. Also, in the snapshot technique, if the time is specified in advance, a volume can be restored to its state as of at that specified point in time, but not to its state as of at an arbitrary point in time.

SUMMARY

The present invention has been made in light of the above, and has an object to of provide a storage apparatus and a volume restoration method with which the amount of data stored in a volume can be reduced, and also with which a volume restoration time can be shortened when restoring data from a past point in time.

According to the invention, a storage apparatus is provided with a function for setting a no-protection period, which is a time period during which restoration is unnecessary, in a protection period, and control is performed so that difference write data between the start time and the finish time of the no-protection period is backed up, without backing up write data as needed in the no-protection period.

This enables reduction of the capacity of the write data to be stored if write data is repeatedly developed in the same area in the no-protection period. Moreover, backup of the data that does not need to be restored is prevented, and also, the reduction of the backup data amount, effective utilization of the volume storage area, and shortening of volume restoration time can be achieved.

Furthermore, according to the present invention, provided is a storage apparatus characterized by including: a first logical volume for storing data sent from a host system; a second logical volume for backing up the data stored in the first logical volume; a third logical volume for storing the data stored in the first logical volume for protection only within a predetermined protection period; a first storage unit for storing protection period information indicating the predetermined protection period; a second storage unit for storing no-protection period information indicating a no-protection period in the predetermined protection period, during which backup to the second logical volume is suspended; and a control unit for conducting, during the protection period, data protection processing for protecting, in the third logical volume, the data stored in the first logical volume by using backup data stored in the second logical volume, and conducting, during the no-protection period within the protection period, data non-protection processing for suspending the data protection processing, and upon receiving an external order for restoring the first logical volume to its state as of at a time not in the no-protection period within the protection period, restoring the first logical volume to its state as of at a time of the order by using the data backed up in the second logical volume and the data protected in the third logical volume.

Accordingly, in the storage apparatus, the control unit conducts, during the protection period, data protection processing for protecting, in the third logical volume, the data stored in the first logical volume by using backup data stored in the second logical volume, and conducts, during the no-protection period—during which backup to the second logical volume is suspended—within the protection period, data non-protection processing for suspending the data protection processing, and upon receiving an external order for restoring the first logical volume to its state as of at the time not in the no-protection period within the protection period, the control unit restores the first logical volume to its state as of at a time of the order by using the data backed up in the second logical volume and the data protected in the third logical volume. Accordingly, the restoration of the data in the first logical volume from a past point in time not in the no-protection period within the protection period can be conducted for a short time.

According to the invention, the storage apparatus and the volume restoration method with which the amount of data stored in a volume can be reduced, and also with which volume restoration time can be shortened when restoring data from a past point in time can be provided.

BRIEF DESCRIPTION OF THE DRAWINGS

FIG. 7 is a diagram showing a no-protection period management table according to the invention.

FIG. 8 is a diagram showing a protection period specification screen, which is displayed in a display unit of an SVP according to the invention.

FIG. 14 is a diagram schematically illustrating processing using a bitmap for section difference according to the invention.

DETAILED DESCRIPTION OF PREFERRED EMBODIMENTS

An embodiment of the present invention will hereinafter be described with reference to the drawings.

Figure 1:
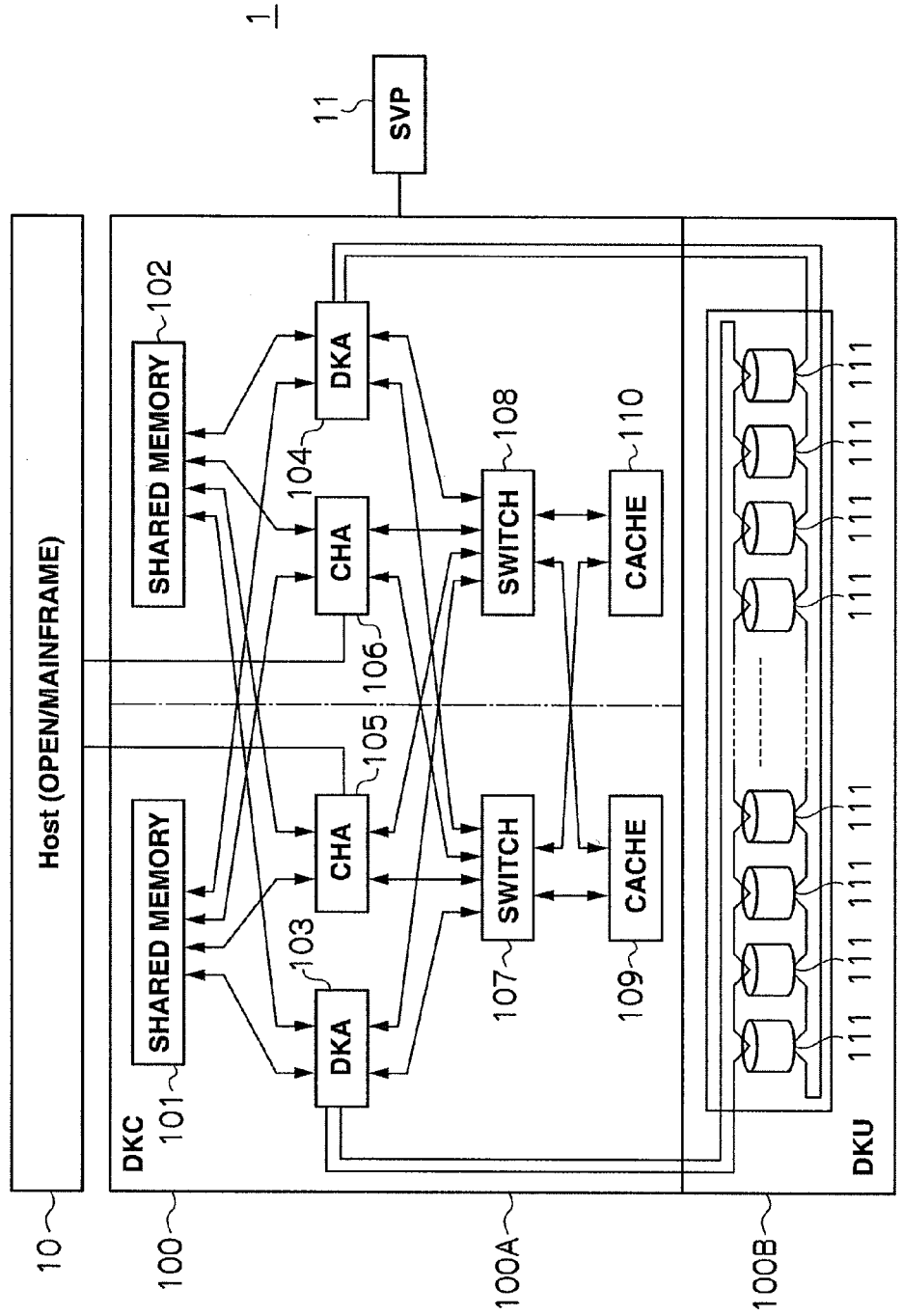
FIG. 1 is a diagram showing a schematic configuration of a storage system according to the present invention.

FIG. 1 is a diagram of a schematic configuration for a storage system that utilizes the invention. As shown in FIG. 1, a storage system 1 includes a storage apparatus 100, a host 10, and an SVP 11.

The host (open/mainframe) 10 is connected to the storage apparatus 100 in a manner enabling communication, and issues write requests, read requests, etc., to the storage apparatus 100.

The SVP 11 is a maintenance terminal for the storage apparatus 100, and includes an operation unit and a display unit (not show in the drawing for omission). A user sets various settings for the storage apparatus 100 by using the operation unit and the display unit.

The storage apparatus 100 includes a disk controller unit (DKC) 100A and a disk unit (DKU) 100B. The disk controller unit 100A has shared memories 101 and 102, disk adapters (DKA) 103 and 104, channel adapters (CHA) 105 and 106, switches 107 and 108, and cache memories 109 and 110. The disk unit 100B has plural hard disk drives 111.

The channel adapters 105 and 106 each are connected to the shared memories 101 and 102 and the switches 107 and 108, and also connected to the host 10. The disk adapters 103 and 104 each are connected to the shared memories 101 and 102 and the switches 107 and 108, and also connected to the plural hard disk drives 111. In addition, the switches 107 and 108 each are connected to the cache memories 109 and 110.

Incidentally, the storage apparatus 100 in FIG. 1 has a double-controller configuration including two of each of the elements, i.e., the shared memories 101 and 102, the disk adapters 103 and 104, the channel adapters 105 and 106, the switches 107 and 108, and the cache memories 109 and 110. However, the storage apparatus 100 may have a single-controller configuration including one of each of the elements, shared memory, disk adapter, channel adapter, switch, and cache memory.

The channel adapters 105 and 106 each are configured as a microcomputer system provided with plural CPUs (Central Processing Units), memories, communication interfaces, etc., and each has a port for being connected to a network or similar. The channel adapters 105 and 106 each execute processing for interpreting and responding to various commands sent from the host 10 via communication lines, and also are designed to realize a CDP function with embedded software that operates in a microprocessor. The CDP function is realized, allowing the CDP processing described later to be executed.

The disk adapters 103 and 104 each are configured as a microcomputer system provided with plural CPUs and memories, and control reading/writing data from/to the hard disk drive 111 in the disk unit 100B. The disk adapters 103 and 104 each write, for example, the data the channel adapter 105 has received from the host 10 to a predetermined address in the hard disk drive 111. The disk adapters 103 and 104 each also send the data read from the hard disk drive 111 to the channel adapters 105 and 106.

The cache memories 109 and 110 and the shared memories 101 and 102 each are storage memory shared by the channel adapters 105 and 106 and the disk adapters 103 and 104. The cache memories 109 and 110 are mainly used to temporarily store data to be written or read that is inputted/outputted to/from the storage apparatus 100. The shared memories 101 and 102 are mainly used to store system configuration information on the configuration of the entire storage apparatus 100, various programs, various tables, and commands such as write requests and read requests. For example, the shared memory 101 stores a state management table 1011, a no-protection period management table 1012, etc.

The switches 107 and 108 are both switches for turning the cache memories 109 and 110 on/off. The disk adapters 103 and 104 each write data to and read data from each hard disk drive 111.

Figure 2:
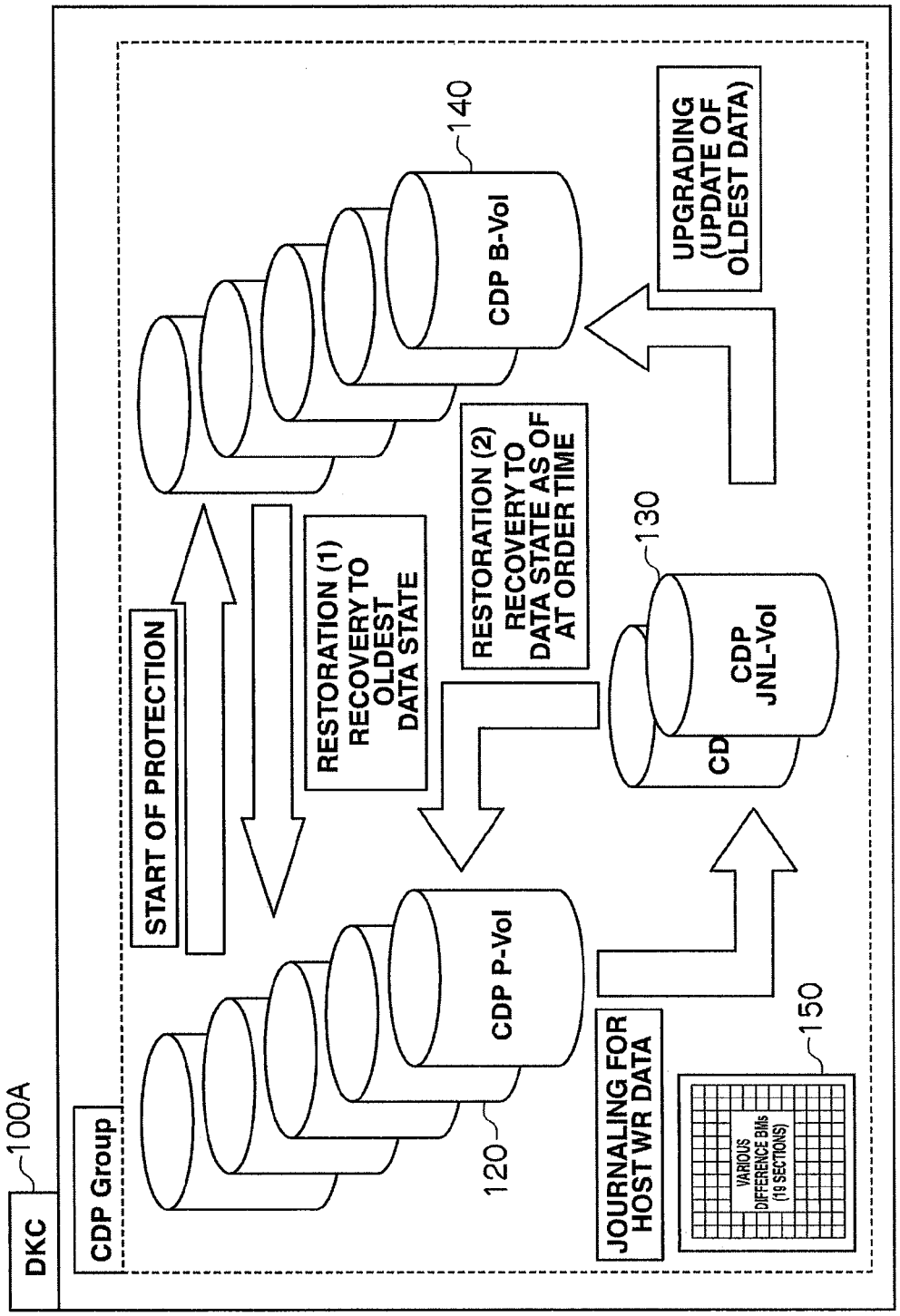
FIG. 2 is a diagram schematically illustrating an internal configuration for a disk controller unit and CDP processing according to the invention.

FIG. 2 is a diagram schematically illustrating an internal configuration for the disk controller unit 100A and CDP processing. CDP can be set for each of plural groups. A CDP group is composed of one or more one-to-one pairs of primary volumes (Pvol) 120 and base volumes (Bvol) 140, and journal volumes (JNLvol) 130 and various difference bitmaps (BM) 150 that correspond to the above pairs.

Note that the primary volumes 120, the journal volumes 130, and the base volumes 140 are all logical volumes (logical devices (LDEV) in the case of 'mainframe', or logical units (LU) in the case of 'open'), and correspond to actual data in the hard disk drive 111 via a not-shown address convert table for converting logical addresses and physical addresses.

The primary volume 120 is a volume in which the host 10 writes I/O (Input/Output) data. The journal volume 130 is a volume for storing backup of the write data written in the primary volume 120 during a protection period using the various difference bitmaps 150. The base volume 140 is a volume for storing the oldest data in the CDP-function specified protection period (in the case of a 24-hour protection period, the data stored prior to the protection period.) Accordingly, the write data written in the primary volume 120 is backed up in the base volume 140 during a predetermined protection period (except the no-protection period described later).

The write data written in the primary volume 120 is stored in the various difference bitmaps 150 and the journal volume 130 through CDP processing, and data for which a predetermined protection period has expired is upgraded from the journal volume 130 to the base volume 140. In this way, regarding the state of the primary volume 120, the oldest data can be recovered, as can data as of at specified time in a predetermined protection period. The above processing will be described later.

Figure 10:
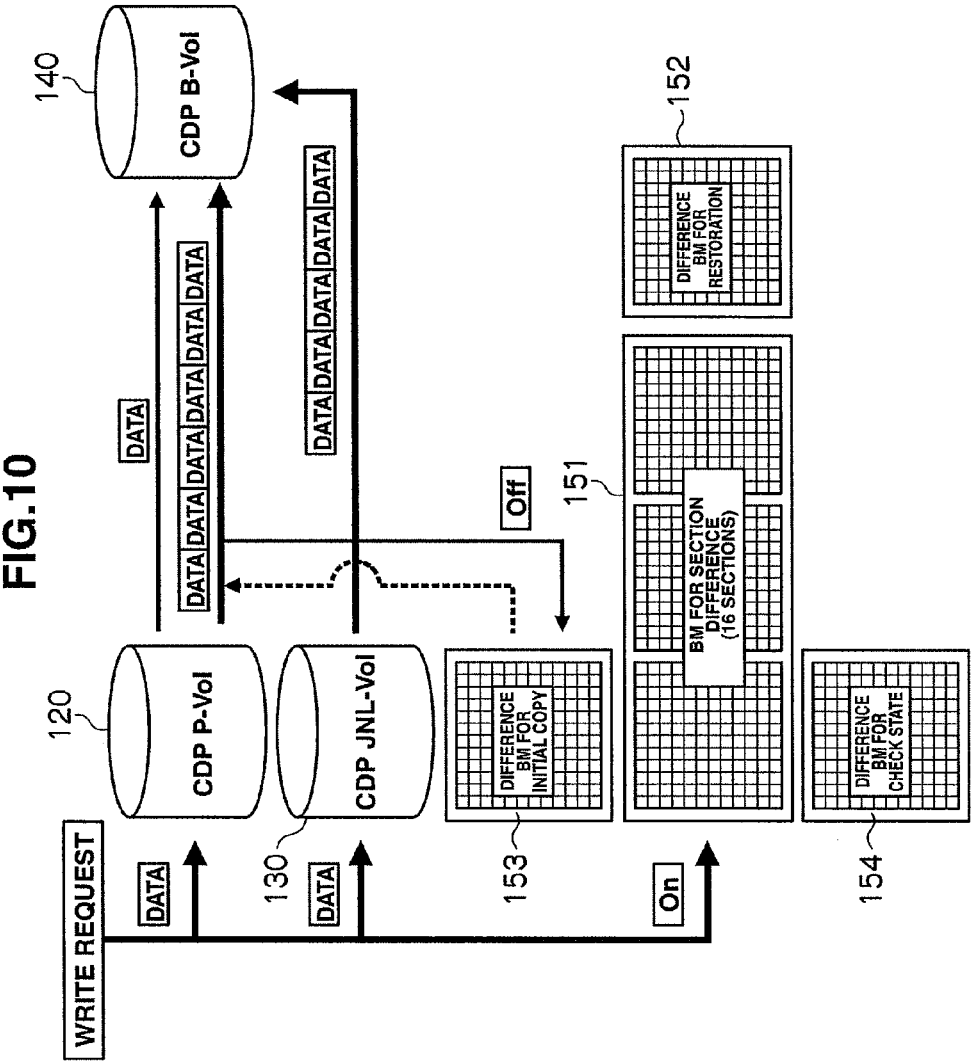
FIG. 10 is a diagram illustrating the state where protection of data written to a primary volume is started in CDP processing according to the invention.

The various difference bitmaps 150 include a bitmap (BM) 151 for section difference, a difference bitmap (BM) 152 for restoration, a difference bitmap (BM) 153 for initial copy, a difference bitmap (BM) 154 for check state, a difference bitmap (BM) 155 for non-protection state, etc., as shown in FIG. 10 and others. The bitmap (BM) 151 for section difference, the difference bitmap (BM) 152 for restoration, the difference bitmap (BM) 153 for initial copy, the difference bitmap (BM) 154 for check state, and the difference bitmap (BM) 155 for non-protection state will be described later.

Figures 3, 4:
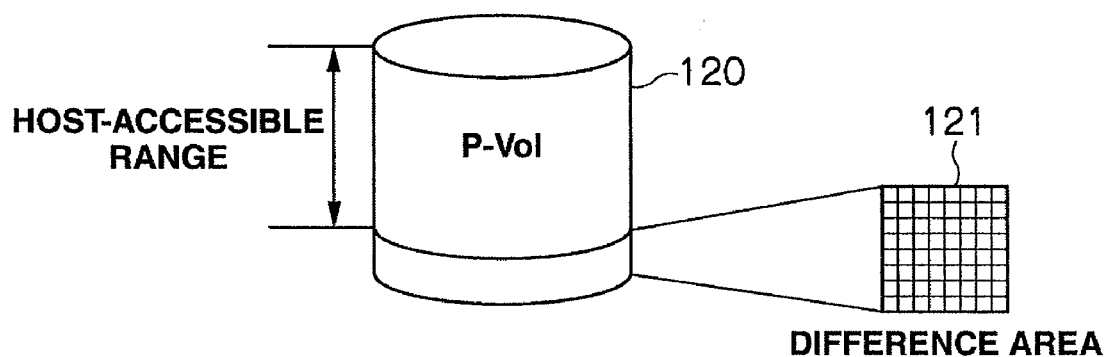
FIG. 3 is a diagram illustrating a primary volume according to the invention.
FIG. 4 is a diagram showing a state management table according to the invention.

FIG. 3 is a diagram illustrating a configuration for the primary volume 120. The primary volume 120 covers a data area accessible by the host 10 and a data area not accessible by the host 10. A difference area 121 is also provided in the data area not accessible by the host 10. Note that, although not shown in the drawing, the configuration of each of the journal volume 130 and the base volume 140 is similar to the configuration of the primary volume 120. Furthermore, the various bitmaps created in the difference area 121 are reserved when a logical volume is created, and are initialized when a pair for conducting CDP processing is created.

FIG. 4 is a diagram showing the state management table 1011. The state management table 1011 includes a state column 1011A, a protection period column 1011B, and a restoration order time column 1011C. The state column 1011A stores information indicating each processing state for executing CDP processing. The protection period column 1011B stores a period during which data is protected by executing CDP processing. The restoration order time column 1011C stores time restoration is ordered.

The processing states for executing CDP processing include "normal state", "CDP copy state", "CDP protection state", "restoration transition state", "restored state", and "suspended state". Each state will be described later. The state column 1011A stores "0" for "normal state", "1" for "CDP copy state", "2" for "CDP protection state", "3" for "restoration transition state", "4" for "restored state", and "5" for "suspended state."

A protection period is set in the protection period column 1011B. For example, the number of hours and days (e.g., several tens of days) is set. In this embodiment, storing the time and the number of days has been described; however, a configuration may be adopted in which a start time and finish time, and start date and finish date are stored. A method for setting a protection period will be described later. The restoration order time column 1011C stores a time restoration is conducted in a restored state.

Figure 5:
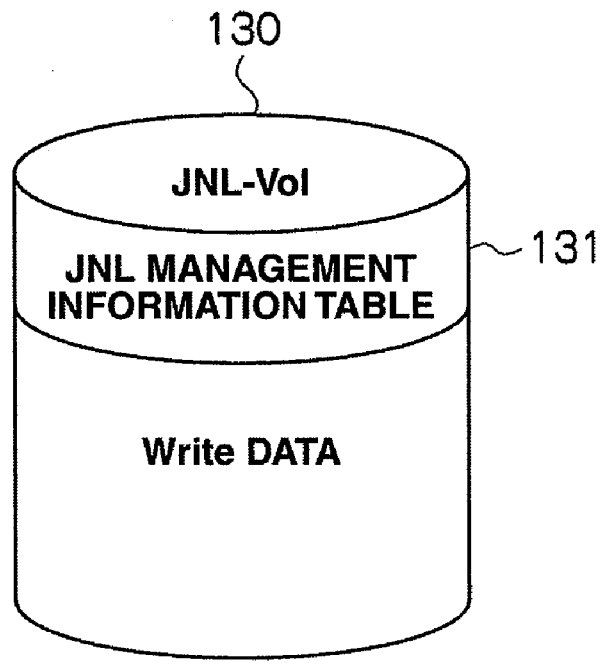
FIG. 5 is a diagram illustrating the content stored in a journal volume according to the invention.

FIG. 5 is a diagram illustrating the content stored in the journal volume 130. The journal volume 130 is composed of an area for storing a state management table 131 and an area for storing write data.

Figure 6:
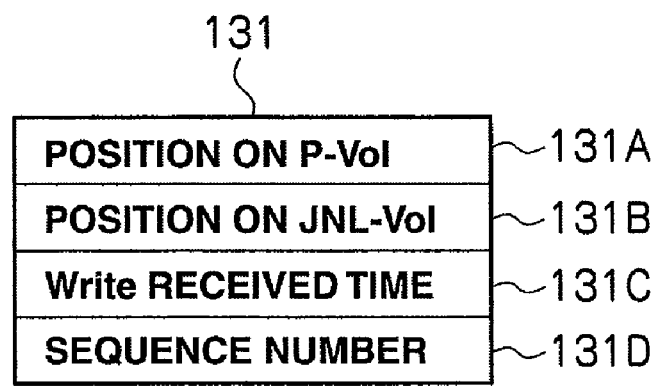
FIG. 6 is a diagram illustrating the content of a state management table according to the invention.

FIG. 6 is a diagram illustrating the content of the state management table 131. Journal management information in the state management table 131 is created for each piece of write data. The state management table 131 is provided with storage columns 131A to 131D. The storage column 131A stores the position in the primary volume 120. The storage column 131B stores the position in the journal volume 130. The storage column 131C stores the receipt time for the write data. The storage column 131D stores a sequence number.

FIG. 7 is a diagram showing the no-protection period management table 1012. The no-protection period management table 1012 includes a state column 1012A, an ID column 1012B, a day column 1012C, a month column 1012D, a start time column 1012E, and a finish time column 1012F.

The state column 1012A is a column for setting the storage apparatus 100 between a protection period during which data is protected by CDP processing and a no-protection period during which data is not protected by CDP processing. When the storage apparatus 100 is in the protection period, "0"—indicating the protection state—is set, while when the storage apparatus 100 is in the no-protection period, "1"—indicating the non-protection state—is set.

The ID column 1012B is a column for setting an 'every day', 'every week', or 'every month' ID. "0", "1", and "2" are set for 'every day', 'every week', and 'every month', respectively. The day column 1012c is a column for setting a day. "0", "1", "2", "3", "4", "5", and "6" are set for Monday, Tuesday, Wednesday, Thursday, Friday, Saturday, and Sunday, respectively. A date is set in the month column 1012D. Namely, a day in every month is set. Thus, any number from 1 to 31 is set in the column. The time the no-protection period is started is set in the start time column 1012E. The time the no-protection period finishes is set in the finish time column 1012F. Note that the ID column 1012B, the day column 1012C, the month column 1012D, the start time column 1012E, and the finish time column 1012F are set as a group.

In the no-protection period management table 1012, "0"— indicating the protection state—is set in the state column 1012A, and "every day: 0:00 to 6:00" and "every week: Sunday: 0:00 to 0:00" are also set as the no-protection periods. Specifically, in the no-protection period management table 1012, "0" in the ID column 1012B, nothing in the day column 1012C and month column 1012D, "0:00" in the start time column 1012E, and "6:00" in the finish time column 1012F are set, corresponding with "every day: 0:00 to 6:00". Also, in the no-protection period management table 1012, "1" in the ID column 1012B, "0" in the day column 1012C, nothing in the month column 1012D, "0:00" in the start time column 1012E, and "0:00" in the finish time column 1012F are set, corresponding with "every week: Sunday: 0:00 to 0:00".

FIG. 8 is a diagram showing a specification screen 12 for the protection period displayed in the display unit of the SVP 11. A user sets the protection period and no-protection period by using the specification screen 12 and the operation unit (not shown in the drawing). Arranged in the specification screen 12 are a column 13 for specifying a protection period (protection-period specification column), a no-protection period specification column 14, an OK button 15, a cancel button 16, a right arrow button 17, a left arrow button 18, and a display column 19.

The period for protection of data written to the primary volume 120 is specified in the protection-period specification column 13. For example, a user operates the operation unit of the SVP 11, specifying 24 hours, 30 days, etc.

In the no-protection period specification column 14, either "every day", 'every week', or 'every month' is set, along with the corresponding 'no-protection time period' for 'every day', 'day and no-protection time period' for 'every week', or 'date and no-protection time period' for 'every month'. For instance, a user operates the operation unit of the SVP 11 to set the desired setting. Note that the no-protection period specified in the no-protection period specification column 14 is any period within the protection period specified in the protection-period specification column 13.

After the setting for the no-protection period finishes as described above, a user operates the operation unit of the SVP 11 to press the right arrow button 17 on the specification screen 12. Then, the set no-protection period is set in the display column 19 for displaying the list of no-protection periods. For example, where a user sets "every day: 0:00 to 6:00" and presses the right arrow button 17, "every day: 0:00 to 6:00" is displayed in the display column 19. Note that plural no-protection periods can be set in the specification screen 12. Thus, when a user also sets "every week: Sunday: 0:00 to 0:00" and presses the right arrow button 17, "every week: Sunday: 0:00 to 0:00" is displayed below "every day: 0:00 to 6:00" in the display column 19. The display column 19 of FIG. 8 shows this situation.

Incidentally, by a user operating the operation unit of the SVP 11 to select a setting for the no-protection period displayed in the display column 19 and pressing the left arrow button 18, the selected no-protection period setting is deleted from the display column 19.

If a user decides that the protection period and no-protection period specified in the specification screen 12 are OK, the user presses the OK button 15 on the specification screen 12 using the operation unit. As a result, the setting information on the setting for the protection period specified in the protection-period specification column 13 and the setting for the no-protection period specified in the no-protection period specification column 14 is sent to the storage apparatus 100 via the SVP 11. Then, the protection period and the no-protection period are set in the state management table 1011 and the no-protection period management table 1012 respectively, by the channel adapter 105 or 106 in the storage apparatus 100.

Figure 30:
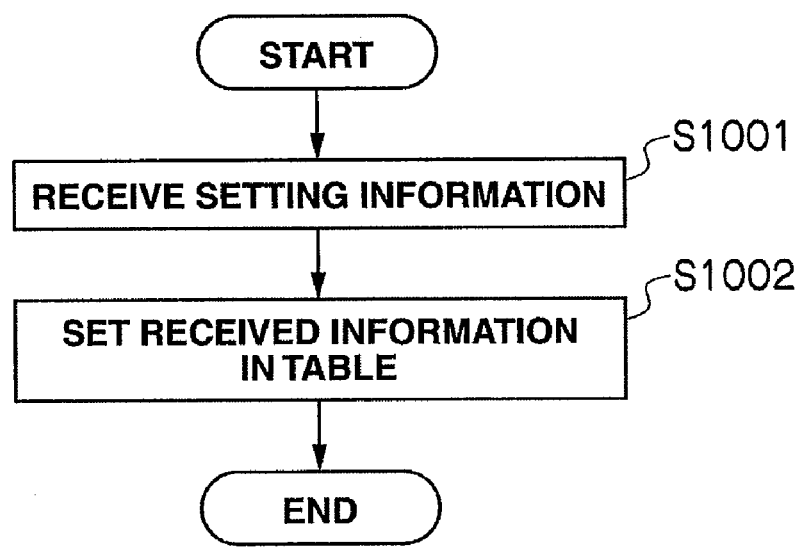
FIG. 30 is a flowchart showing processing for setting information according to the invention.

FIG. 30 is a flowchart showing the processing at the point in time the storage apparatus 100 receives the setting information from the SVP 11. As shown in FIG. 30, upon receiving the setting information (S1001), the channel adapter 105 sets the setting information in the tables (S1002). More specifically, the setting for the protection period and the setting for the no-protection period are stored in the state management table 1011 and the no-protection period management table 1012, respectively.

Incidentally, when a user presses the cancel button 16 instead of the OK button 15, the content set in the protection-period specification column 13 and the no-protection period specification column 14 is cleared.

This embodiment adopts a configuration in which the protection period and no-protection period are set by using the specification screen 12, which is displayed in the display unit, and the operation unit in the SVP 11; however, this embodiment is not limited to this configuration. A configuration may be adopted where a no-protection period is provided in a protection period for conducting CDP processing by receiving a start command that starts the no-protection period from the host 10 and a termination command that finishes the no-protection period. More specifically, for example, the channel adapter 105 sets "1" (indicating the no-protection period) in the state column 1012A of the no-protection period management table 1012 when receiving the start command from the host 10, and sets "0" in the state column 1012A of the no-protection period management table 1012 when receiving the finish command from the host 10.

Also, the CDP function can be set for each group. So for instance, a user specifies a CDP group on a separate specification screen from the specification screen 12 by using the operation unit of the SVP 11, and then, conducts setting for the protection period and no-protection period, etc., on the specification screen 12. This enables setting using the specification screen 12 for each CDP group.

Figure 9:
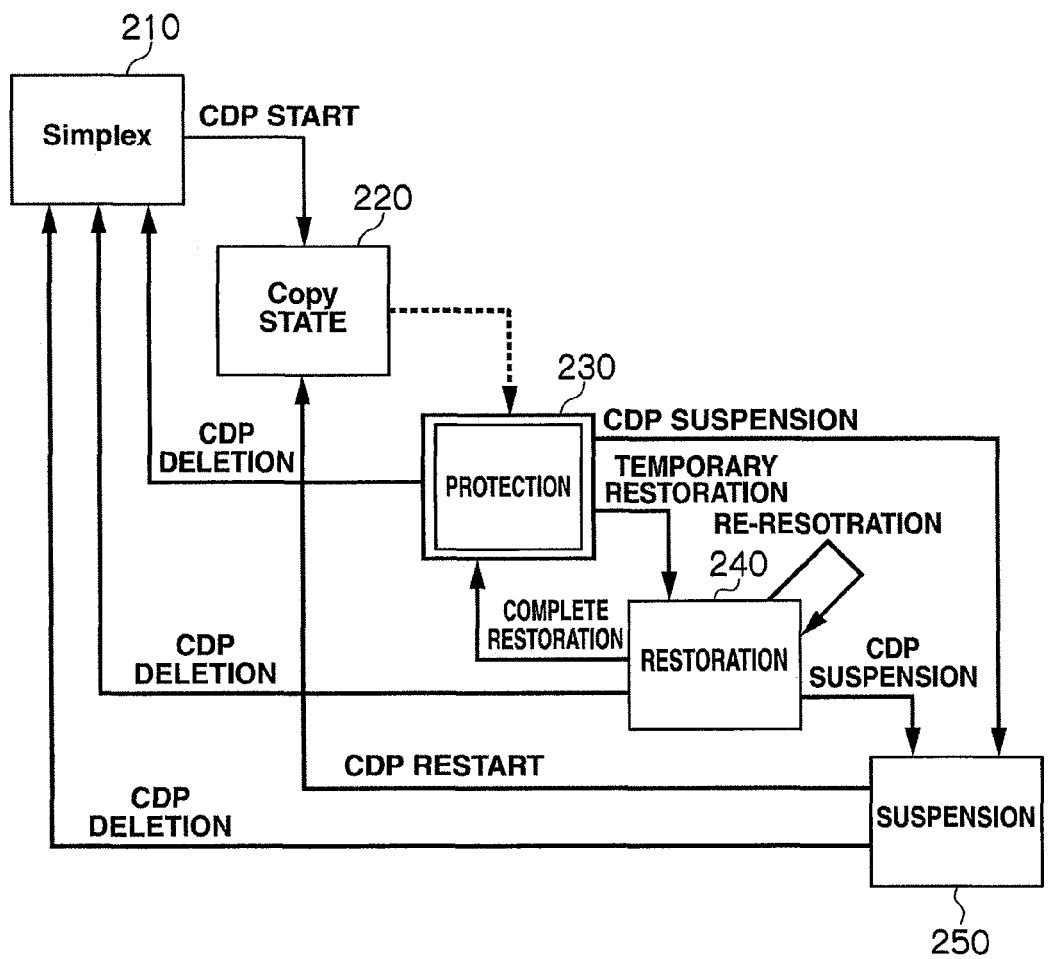
FIG. 9 is a diagram illustrating the operation flow in CDP processing according to the invention.

FIG. 9 is a diagram illustrating the operation flow in CDP processing. Five states, a normal (simplex) state 210, a copy state 220, a protection state 230, a restored state 240, and a suspended state 250 are shown as operational states.

The normal (simplex) state 210 is a state where data is not protected. As a result, even when write data enters the primary volume, no write data is stored in the journal volume 130 and the base volume 140.

Then, when CDP start is ordered, the operational state shifts to the copy state 220. In the copy state 220, processing for creating the base volume 140 and backing up the write data written in the primary volume 120 in the journal volume 130 is started. When such backup is started and creation of the base volume 140 is terminated, the operational state shifts to the protection state 230. After the shift to the protection state 230, it becomes possible that the data from an arbitrary point in time is restored.

In the protection state 230, when the data in the primary volume 120 from an arbitrary point in time needs to be restored, temporary restoration is ordered, so that the operational state shifts to the restored state 240. Restoring processing is executed in the restored state 240. Restoration is processing for restoring a primary volume using the data in the base volume 140 and the data in the journal volume 130. If the data restored by this restoring processing is incomplete, re-restoration is ordered, and the restoring processing is executed again. This process is repeated, and when the data restored by the restoring processing is complete, complete restoration is ordered, and the operational state shifts to the protection state 230 again. Accordingly, data is determined. Then, data backup is continuously conducted.

On the other hand, if CDP suspension is ordered in the protection state 230 or the restored state 240, the operational state shifts to the suspended state 250. The suspended state 250 is a state where CDP processing is under suspension. When CDP restart is ordered in the suspended state 250, the operational state shifts to the protection state 230, and data backup via CDP processing is restarted. Furthermore, if CDP deletion is ordered in the protection state 230, the restored state 240, or the suspended state 250, the operational state shifts to the normal state 210.

FIG. 10 is a diagram illustrating the state at a point in time when the protection of the data written to the primary volume 120 via CDP processing is started.

First, the bitmap 151 for section difference, the difference bitmap 152 for restoration, the difference bitmap 153 for initial copy, and the difference bitmap 154 for check state will be described. Incidentally, the bitmap 151 for section difference, the difference bitmap 152 for restoration, the difference bitmap 153 for initial copy, the difference bitmap 154 for check state, and the difference bitmap 155 for non-protection state are used by the channel adapter 105 in accordance with each state in CDP processing.

Also, for each of the bitmap 151 for section difference, the difference bitmap 152 for restoration, the difference bitmap 153 for initial copy, the difference bitmap 154 for check state, and the difference bitmap 155 for non-protection state, one bit corresponds to one of the tracks that store data in the hard disk drive 111.

The bitmap 151 for section difference is a 16-sectioned bitmap. Note that only 3 sections are shown in FIG. 10 and others. 14 of the 16 sections of the bitmap 151 for section difference are used to store data for 14 periods obtained by dividing a protection period. The remaining two sections are used for switching of the divided periods, etc.

The difference bitmap 152 for restoration is used in the processing for restoration. The difference bitmap 153 for initial copy is used when the channel adapter 105 receives CDP creation order. The difference bitmap 154 for check state is used for the processing when temporary restoration is ordered. The difference bitmap 155 for non-protection state is used for the processing in the no-protection period.

When CDP start is ordered, write data is copied from the primary volume 120 to the base volume 140. When the protection of the write data from the host 10 to the primary volume 120 is started, the write data is stored in the primary volume 120 and the journal volume 130, as shown in FIG. 10. In addition, the bitmap 151 for section difference is set to be on.

At this point, regarding the base volume 140, write data for an area for which copying has not been conducted is copied by copying data from the primary volume 120 to the base volume 140 in succession to the above write data copy. Regarding the journal data for which the protection period for data protection has expired, the data is upgraded from the journal volume 130. Upgrading is processing for deleting the relevant journal data from the journal volume 130 and shifting the journal data to the base volume 140. Moreover, a protection period is divided into 14 periods, and the 14 sections of the bitmap 151 for section difference are switched depending on the relevant divided period to conduct difference management. For example, if the protection period is set to be 14 hours, switching of the difference bitmap is performed on a one-hour basis. Note that the bitmap 151 for section difference is initialized at the start of CDP processing.

Next, the processing at the time of the start of protection of data written to the primary volume 120 via CDP processing will be described with reference to FIGS. 22 to 24.

Figure 22:
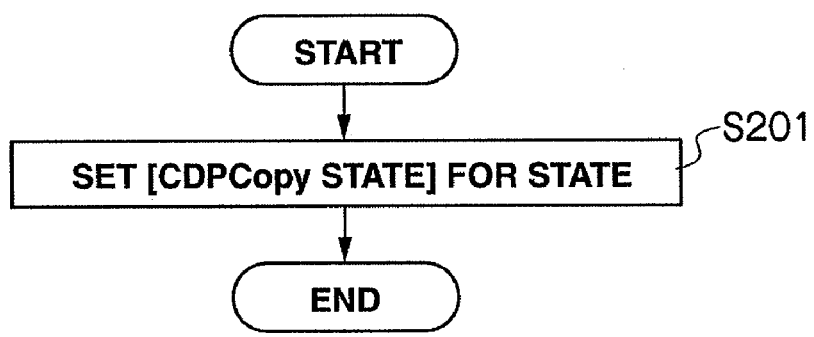
FIG. 22 is a flowchart showing processing for ordering CDP creation according to the invention.

FIG. 22 is a flowchart showing the processing for ordering CDP creation. This processing is executed by the channel adapter 105 when the channel adapter 105 receives the CDP creation order. Upon receiving the CDP creation order, the channel adapter 105 sets the "CDP copy state" for the state (S201). As a result, "1" is set in the state column 1011A of the state management table 1011, which leads to the CDP copy state.

Figure 23:
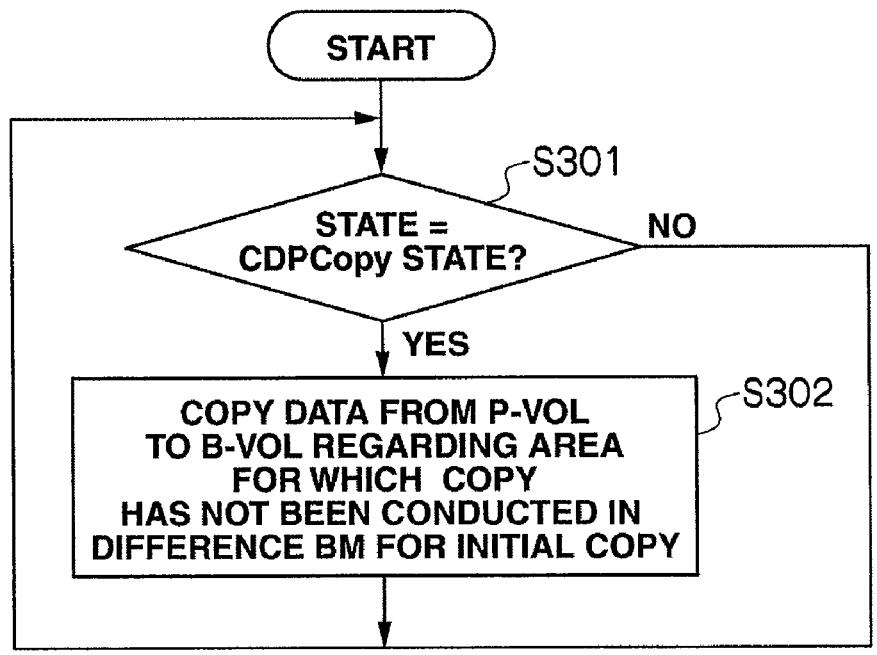
FIG. 23 is a flowchart showing processing for copying data from a primary volume to a base volume according to the invention.

FIG. 23 is a flowchart showing the processing for copying data from the primary volume 120 to the base volume 140. This copying processing is activated when the storage apparatus 100 is started up.

The channel adapter 105 judges whether or not CDP processing is in the CDP copy state (S301). This judgment is conducted based on the setting in the state column 1011A of the state management table 1011. If the channel adapter 105 determines that the processing is in the CDP copy state (S301: YES), i.e., if "1" is set in the state column 1011A, the channel adapter 105 copies the data concerning the area for which copying has not been conducted in the difference bitmap 153 for initial copy from the primary volume 120 to the base volume 140 (S302). If the channel adapter 105 conducts the above data copy, or if the channel adapter 105 determines that the processing is not in the CDP copy state at step S301 (S301: NO), i.e., if "0", "2", "3", "4", or "5" has been set in the state column 1011A, the channel adapter 105 returns to step S301.

Figure 24:
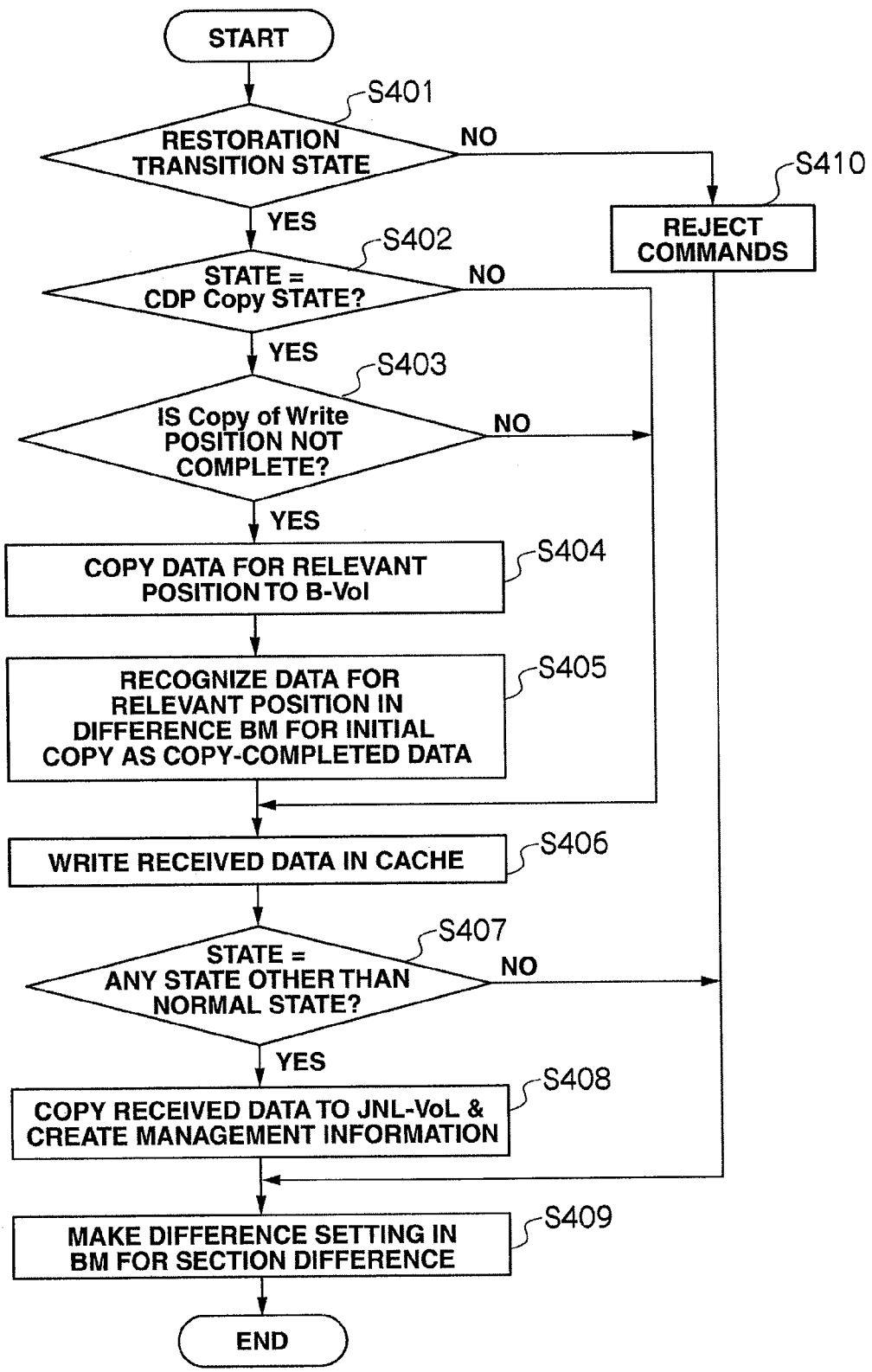
FIG. 24 is a flowchart showing processing upon receipt of write data according to the invention.

FIG. 24 is a flowchart showing the processing when the channel adapter 105 receives write data from the host 10. This processing starts when the channel adapter 105 receives the write data.

First, the channel adapter 105 judges whether or not the processing is in a restoration transition state (S401). This judgment is made based on the setting in the state column 1011A of the state management table 1011. When the channel adapter 105 determines that the processing is in the restoration transition state, i.e., if "3" is set in the state column 1011A (S401: YES), the channel adapter 105 judges whether or not the processing is in the CDP copy state. This judgment is made based on the setting in the state column 1011A of the state management table 1011 as in step S401.

If the channel adapter 105 determines that the processing is in the CDP copy state, i.e., if "1" is set in the state column 1011A (S402: YES), the channel adapter 105 judges whether or not the copying of the write position of the write data is incomplete (S403).

If it is determined that the copying of the write position of the write data is incomplete (S403: YES), the channel adapter 105 copies the data for the relevant position to the base volume 140 (S404). Then the channel adapter 105 recognizes the data for the relevant position in the difference bitmap 153 for initial copy as copy-completed data (S405).

If the channel adapter 105 executes the above processing for recognizing the data as copy-completed data; the channel adapter 105 determines that the processing is not in the CDP copy state at step S402, i.e., any numeral other than "3" is set in the state column 1011A (S402: NO); or the copying of the write position is not incomplete, i.e., any numeral other than "1" is set in the state column 1011A (S403: NO), the channel adapter 105 writes the received data (write data the channel adapter 105 has received) in the cache 109 (S406). Note that the received data may be written in the cache 110.

After writing the write data received at step S406 in the cache 109, the channel adapter 105 judges whether or not the processing is in a state other than the normal state (S407). This judgment is made based on the setting in the state column 1011A of the state management table 1011 as in step S401. In other words, if "0" is set in the state column 1011A, the channel adapter 105 determines that the processing is in the normal state, while if any of "1" through "5" is set in the state column 1011A, the channel adapter 105 determines that the processing is not in the normal state.

If it is determined that the processing is in a state other than the normal state (S407: YES), the channel adapter 105 copies the received data to the journal volume 130, and creates management information (S408). If the channel adapter 105 executes the processing at step S408; the channel adapter 105 determines that the processing is not in any state other than the normal state, i.e., the processing is in the normal state at step S407 (S407: NO); or the channel adapter 105 determines that the processing is not in a restoration transition state at step S401 (S401: NO) and it rejects receiving commands (S410), difference setting is configured relative to the bitmap 151 for section difference (S409).

Figure 11:
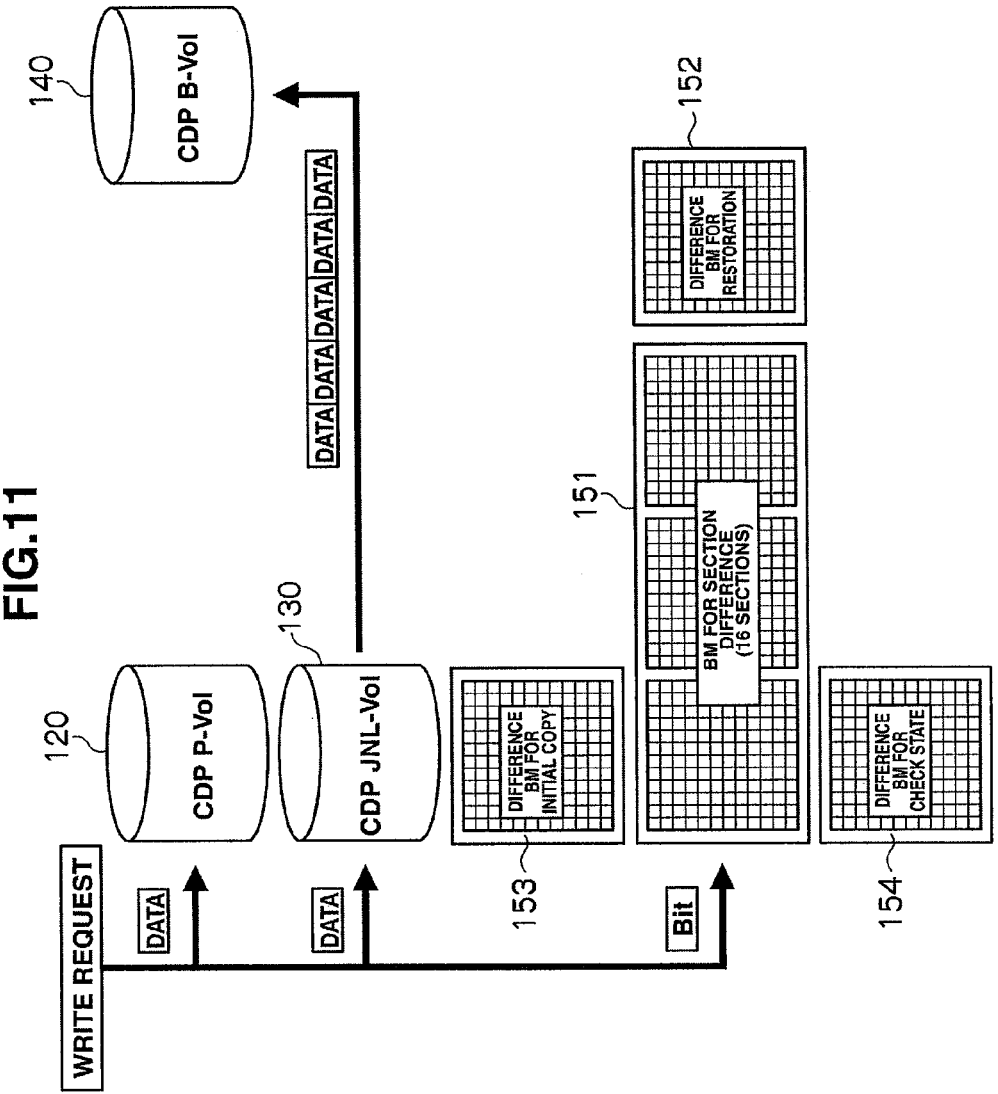
FIG. 11 is a diagram illustrating the protection state where protection of data written to the primary volume is in execution in CDP processing according to the invention.

FIG. 11 is a diagram illustrating the protection state where the data written to the primary volume is protected via CDP processing. During the protection of the data written to the primary volume 120, the write data is stored in the primary volume 120 and the journal volume 130, as shown in FIG. 11. In addition, a bit is set at the position corresponding to the write data storage position in the bitmap 151 for section difference.

Then, the journal data for which the protection period has expired is subjected to the processing for upgrading data from the journal volume 130 to the base volume 140. Note that, in the bitmap 151 for section difference, a protection period is divided into 14 periods and the corresponding sections are switched depending on the relevant divided period, thereby conducting difference management for bits. For example, if the protection period is set for 14 hours, the section switching of the bitmap 151 for section difference is conducted on a one-hour basis.

Figure 25:
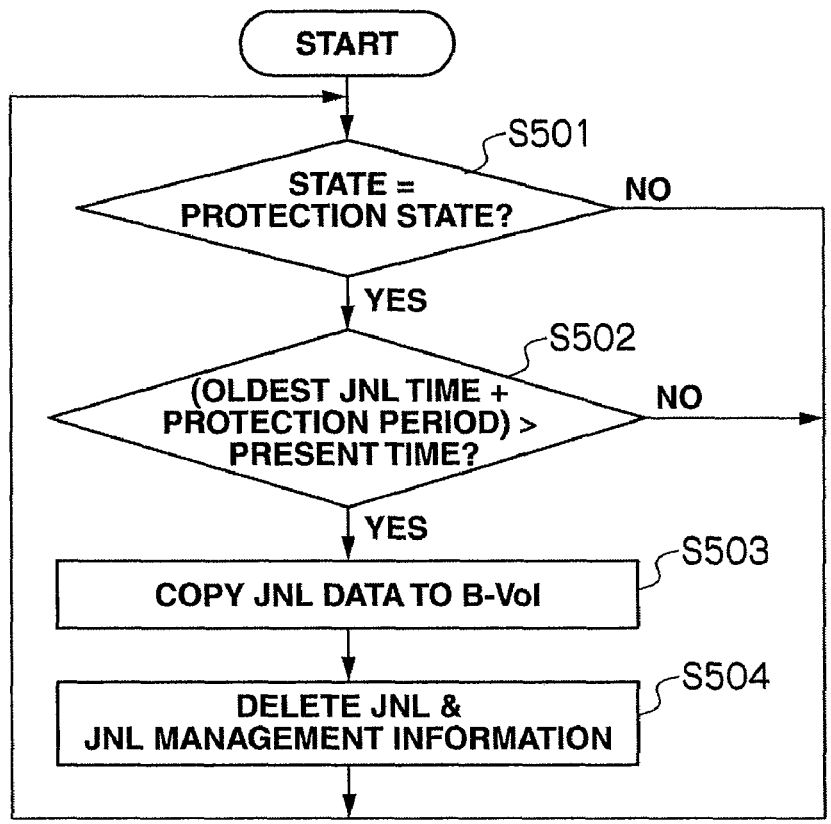
FIG. 25 is a flowchart showing processing for copying data from a journal volume to a base volume according to the invention.

FIG. 25 is a flowchart showing the processing for copying data from the journal volume 130 to the base volume 140, i.e., the upgrade processing in FIG. 11. This processing is activated when the storage apparatus 100 is started up.

The channel adapter 105 judges whether or not the processing is in a protection state (S501). This judgment is made based on the setting in the state column 1011A of the state management table 1011. If the channel adapter 105 determines that the processing is in the protection state, i.e., where "2" is set in the state column 1011A (S501: YES), the channel adapter 105 judges whether or not the time obtained by adding the protection period to the earliest journal time is later than the present time (S502).

Where the obtained time is later than the present time (S502: YES), the channel adapter 105 copies the journal data to the base volume 140 (S503). Namely, the upgrade processing is executed. Then, the channel adapter 105 deletes the already-copied journal data and the corresponding journal management information (S504).

If the channel adapter 105 executes the processing at step S504 (S501: NO); the channel adapter 105 determines that the processing is not in the protection state at step S501; or the channel adapter 105 determines that the obtained time is not later than the present time at step S502 (S502: NO), the channel adapter 105 returns to step S501.

Figure 12:
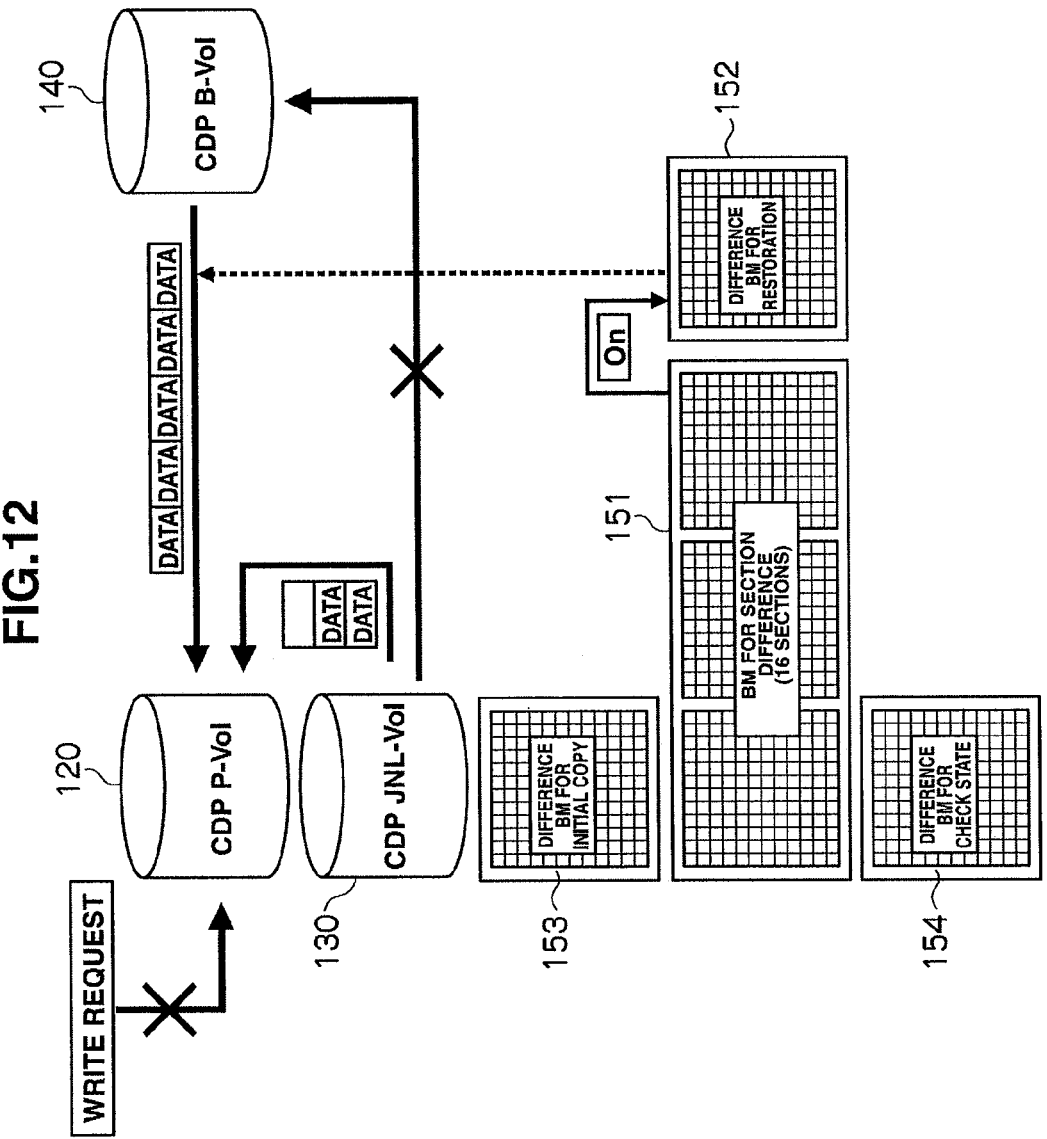
FIG. 12 is a diagram illustrating the restored state in CDP processing according to the invention.

FIG. 12 is a diagram illustrating restoration by CDP processing. A user specifies a restoration order time, and making the restoration order leads to the restored state. The write data to the primary volume 120 is rejected in the restored state. Then, the OR data in the bitmap 151 for section difference, which corresponds to the restoration time ordered by the user, is created in the difference bitmap 152 for restoration. Then, the difference bitmap 154 for check state is cleared. Note that upgrade processing in the restored state is suspended.

Subsequently, after the creation of the difference bitmap 152 for restoration, the data for the bits set on the difference bitmap 152 for restoration is copied from the base volume 140 to the primary volume 120. Then, after the completion of data copy from the base volume 140, the data in the primary volume 120 is overwritten with the journal data in the journal volume 130 after the restoration order time.

Figure 26:
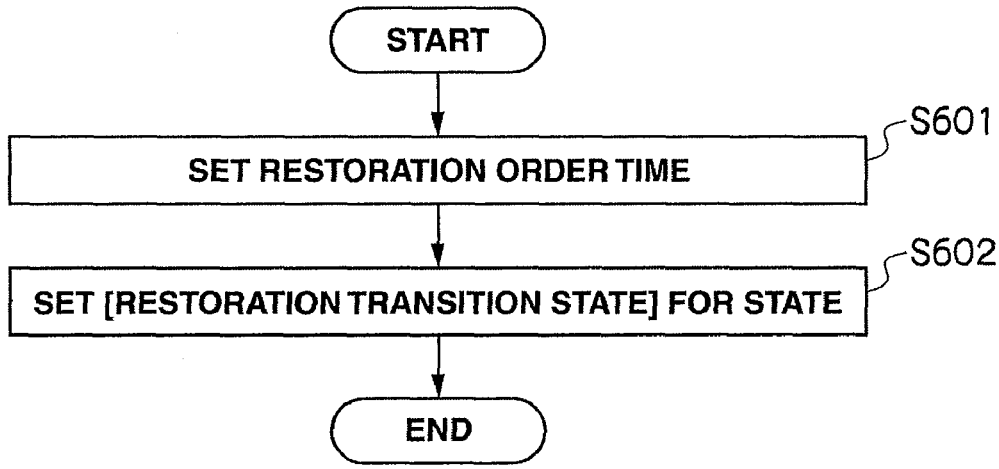
FIG. 26 is a flowchart showing restoring processing according to the invention.

FIG. 26 is a flowchart showing the primary-volume restoring processing. The primary-volume restoring processing is started when the channel adapter 105 receives a restoration request.

Upon receiving the restoration request, the channel adapter 105 sets the restoration order time in the restoration order time column 1011C of the state management table 1011 (S601). Then the channel adapter 105 sets the "restoration transition state" as the state (S602), i.e., "3" is set in the state column 1011A of the state management table 1011.

Figure 27:
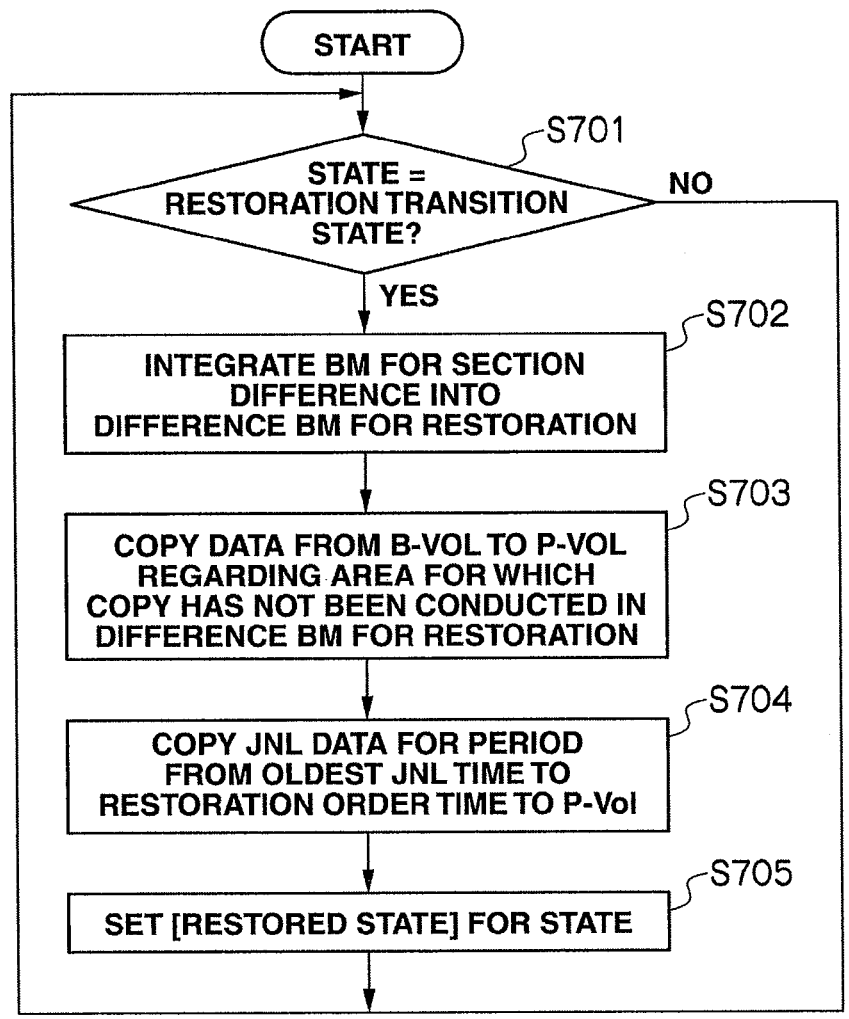
FIG. 27 is a flowchart showing processing for copying data from a base volume to a primary volume according to the invention.

FIG. 27 is a flowchart showing the processing for copying data from the base volume 140 to the primary volume 120. The processing is activated when the storage apparatus 100 is started up.

The channel adapter 105 judges whether or not the processing is in the restoration transition state (S701). This judgment is made based on the setting in the state column 1011A of the state management table 1011. If the channel adapter 105 determines that the processing is in the restoration transition state, i.e., if "3" is set in the state column 1011A (S701: YES), the channel adapter 105 integrates the bitmap 151 for section difference into the difference bitmap 152 for restoration (S702).

Then, the channel adapter 105 copies the data from the base volume 140 to the primary volume 120 regarding the area that has not been subjected to copying in the difference bitmap 152 for restoration (S703). Then, the channel adapter 105 copies the data for the period that covers from the earliest journal data time to the restoration order time set in the restoration order time column 1011C of the state management table 1011 (S704). After that, the channel adapter 105 sets the "restored state" as the state (S705), i.e., "4" is set in the state column 1011A of the state management table 1011.

If the "restored state" is set at step S705 or the channel adapter 105 determines that the processing is not in the restoration transition state at step S701, i.e., if any numeral other than "3" is set in the state column 1011A (S701: No), the channel adapter 105 returns to step S701.

Figures 13, 15:
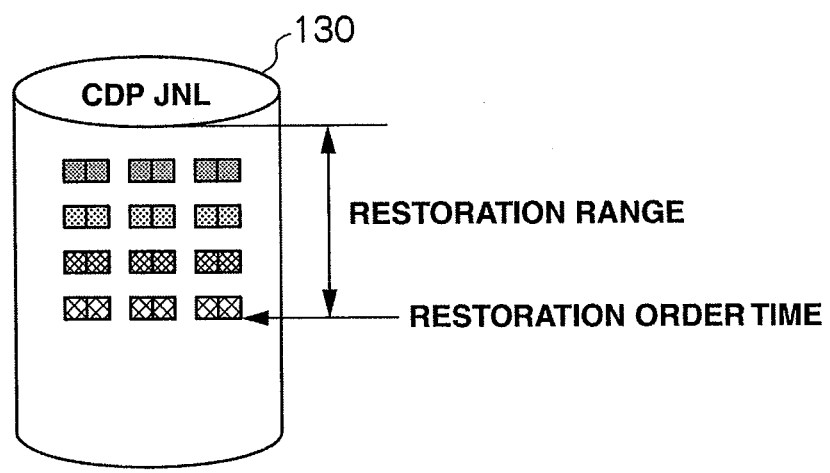
FIG. 13 is a diagram schematically illustrating processing using a bitmap for section difference according to the invention.
FIG. 15 is a diagram schematically illustrating processing using a bitmap for section difference according to the invention.

FIGS. 13 to 15 are diagrams schematically illustrating processing using the bitmap 151 for section difference. In a brief description of the bitmap 151 for section difference, the bitmap 151 for section difference having 4 sections will be described with reference to FIGS. 13 and 14.

As the conditions, "3 hours" for the protection period, "5:00" for the start time for the bitmap for section difference, "8:30:00.000" for the restoration start time, and "7:15" for the restoration order time are set. A table T1 shown in FIG. 13 is a table where those set conditions allocated for the 4 sections of the bitmap 151 for section difference are set.

The items in the table T1 are items T11 to T14. Item T11 is an item showing the conditions set for the first section, item T12 is an item showing the conditions set for the second section, item T13 is an item showing the conditions set for the third section, and item T14 is an item showing the conditions set for the fourth section. Also, a difference start time and a difference finish time are set in each of items T11 to T14. For instance, "5:00:00.000" and "5:59:59.999" are set as the respective difference start time and finish time for the first section of item T11.

Moreover, the time for the base volume 140 at the time of CDP processing is set in a table T2. As shown in FIG. 13, the time "4:59:59.999" is set in the table T2.

During restoration, first the primary volume 120 and the base volume 140 need to be in the same states. At this point, the minimum amount of data is copied by using the bitmap 151 for section difference, without copying the entire data from the base volume 140 to the primary volume 120. The entire bitmap 151 for section difference is integrated into the difference bitmap 152 for restoration (OR processing) at the time of restoration, and copying is performed from the base volume 140 to the primary volume 120 in accordance with the resultant difference bitmap 152 for restoration.

FIG. 14 illustrates integration of the data stored in the first to fourth sections of the bitmap 151 for section difference into the difference bitmap 152 for restoration. The data, which is obtained by integrating the data stored in the first to fourth sections of the bitmap 151 for section difference into the difference bitmap 152 for restoration, and the data stored in the base volume are copied to the primary volume 120.

FIG. 15 shows the restoration order time and restoration range of the journal volume 130. The journal data specified with the restoration order time and restoration range is stored in the journal volume 130.

Figure 16:
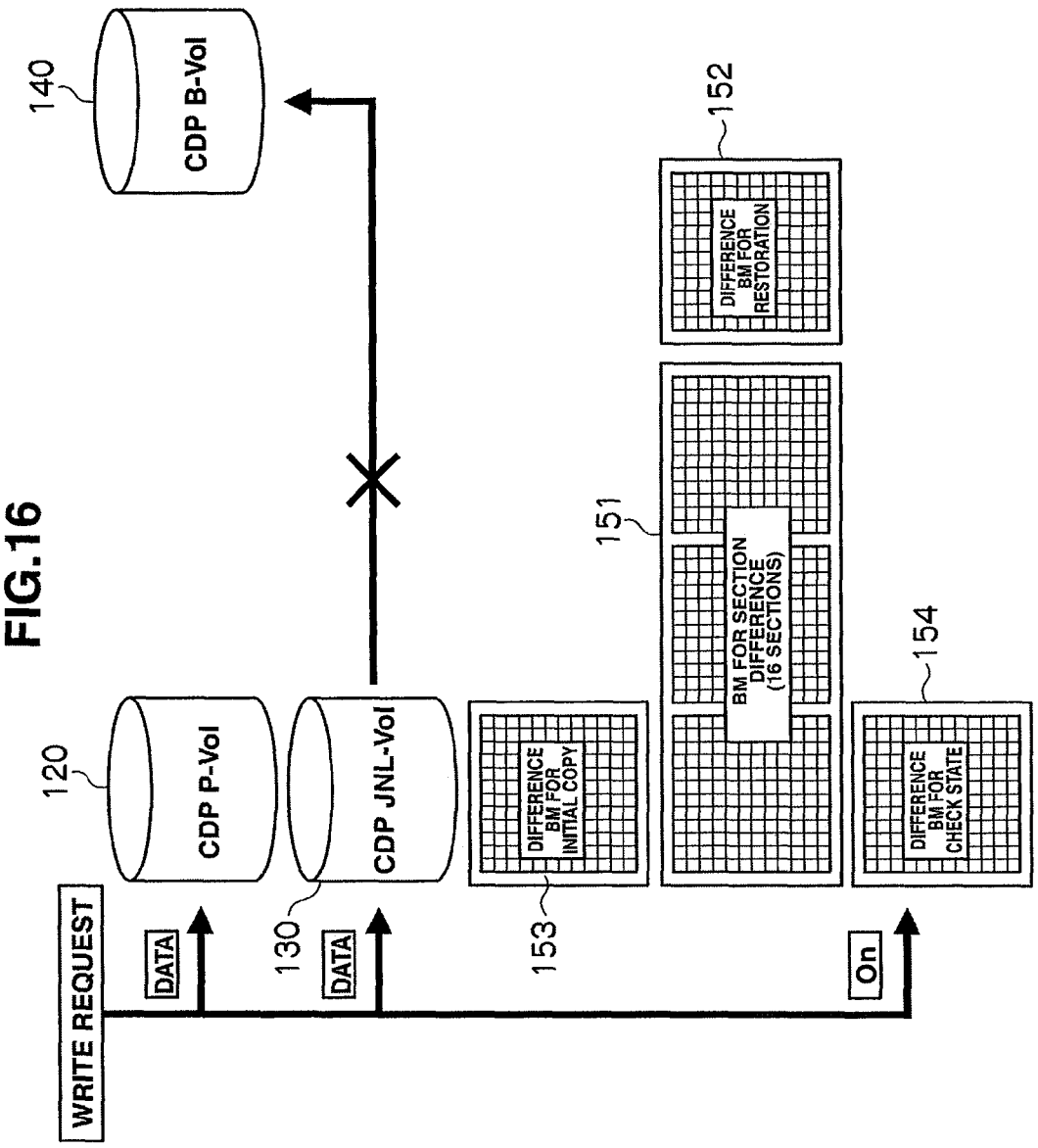
FIG. 16 is a diagram illustrating processing in temporary restoration according to the invention.

FIG. 16 is a diagram illustrating the processing in the restored state (check state). In the processing in the restored state, the write data to the primary volume 120 is stored in the primary volume 120 and the journal volume 130, as shown in FIG. 16, and the journal data is also collected. Also, the data in the bitmap 151 for section difference cannot be discarded in the restored state, so the difference bitmap 154 for check state is set to be on.

Figure 17:
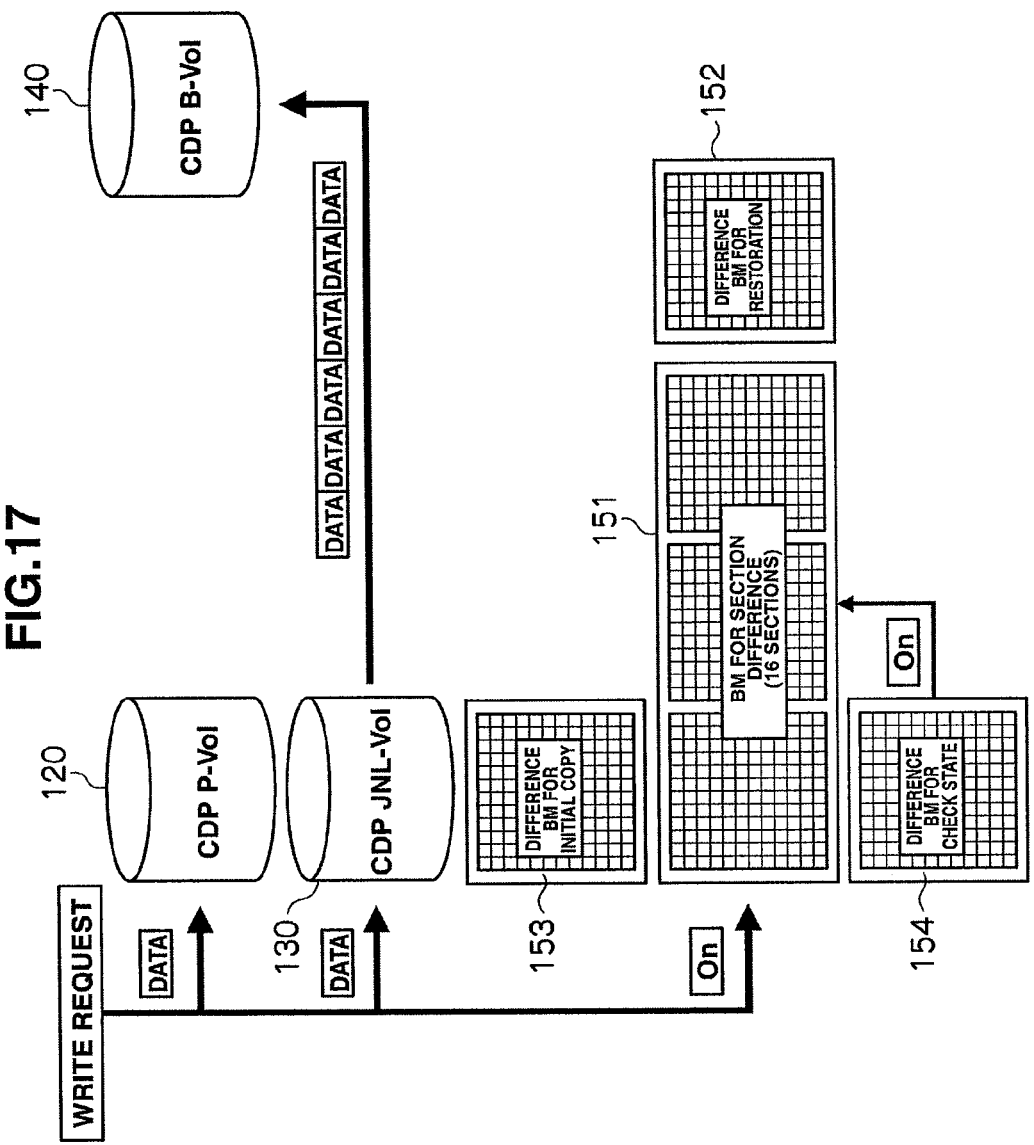
FIG. 17 is a diagram illustrating journal invalidation through processing in complete restoration according to the invention.

FIG. 17 is a diagram illustrating the processing upon complete restoration. In the processing upon complete restoration, the write data to the primary volume 120 is stored in the primary volume 120 and the journal volume 130, as shown in FIG. 17. Then, the difference in the check state is reflected in the latest section of the bitmap 151 for section difference, and invalidation of the journal data in the invalidation range of the journal volume 130 is implemented. After that, the bitmap 151 for section difference is set to be 'on.' Subsequently, the journal data for which the protection period has expired is upgraded from the journal volume 130 to the base volume 140. Then, the normal data upgrade processing is executed.

Figure 28:
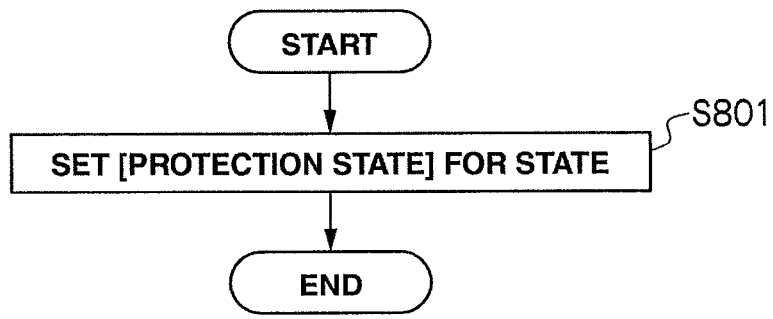
FIG. 28 is a flowchart showing processing in complete restoration according to the invention.

FIG. 28 is a flowchart showing the processing executed upon complete restoration. The processing starts when the channel adapter 105 receives a complete restoration request. Upon receiving the complete restoration request, the channel adapter 105 sets "2" in the state column 1011A of the state management table 1011 (S801). As a result, the processing is brought into the CDP protection state.

Figure 18:
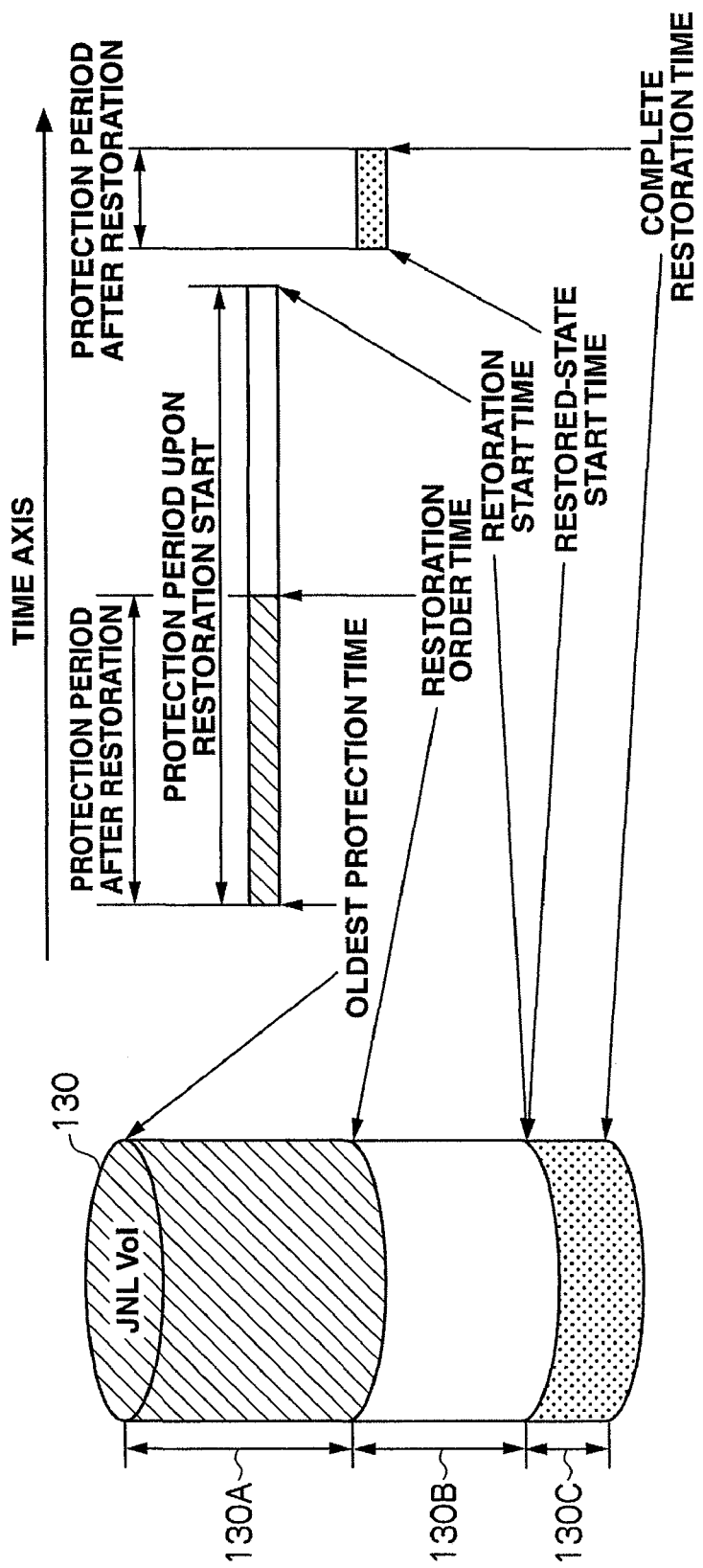
FIG. 18 is a diagram illustrating processing in complete restoration according to the invention.

FIG. 18 is a diagram illustrating invalidation of journal data upon complete restoration. A period 130A and a period 130C in the journal volume 130 are protection periods, and a period 130B indicates a journal invalidation range upon complete restoration. The journal invalidation range is excluded from the protection period after the complete restoration.

As shown in FIG. 18, the start time of the period 130A is the earliest protection time; the finish time of the period 130A, i.e., the start time of the period 130B is a restoration order period; the finish time of the period 130B, i.e., the start time of the period 130C is a restoration start time; and the finish time of the period 130C is a complete restoration time.

The period from the earliest protection time to the restoration order time corresponds to the protection period after restoration; the period from the earliest protection time to the restoration start time corresponds to the protection period at the time of start of restoration; and the period from the restored state start time to the complete restoration time corresponds to the protection period after restoration.

Figure 19:
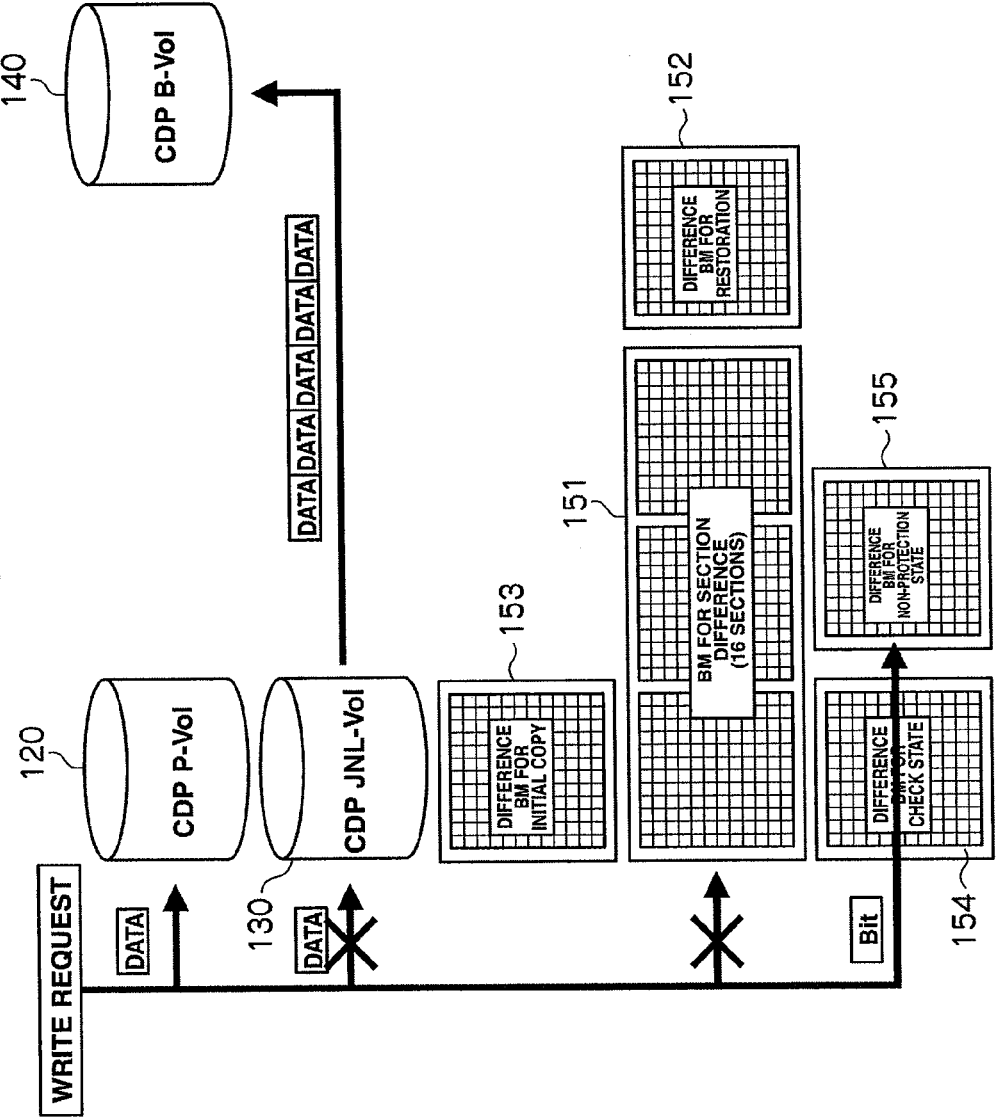
FIG. 19 is a diagram illustrating the operation in a no-protection period in CDP processing according to the invention.

FIG. 19 is a diagram illustrating the operation in the no-protection period in CDP processing. The write data to the primary volume 120 is stored in the primary volume 120, as shown in FIG. 19. However, the data is not in the journal volume 130, and so the journal data is not collected. Also, the bits corresponding to the data stored in the primary volume 120 are not in the bitmap 151 for section difference. The difference bitmap 155 for non-protection state in the no-protection period is set to 'on,' and the bits corresponding to the data stored in the primary volume 120 are stored in the difference bitmap 155 for non-protection state. Then the journal data for which the protection period has expired is upgraded from the journal volume 130 to the base volume 140.

Figure 29:
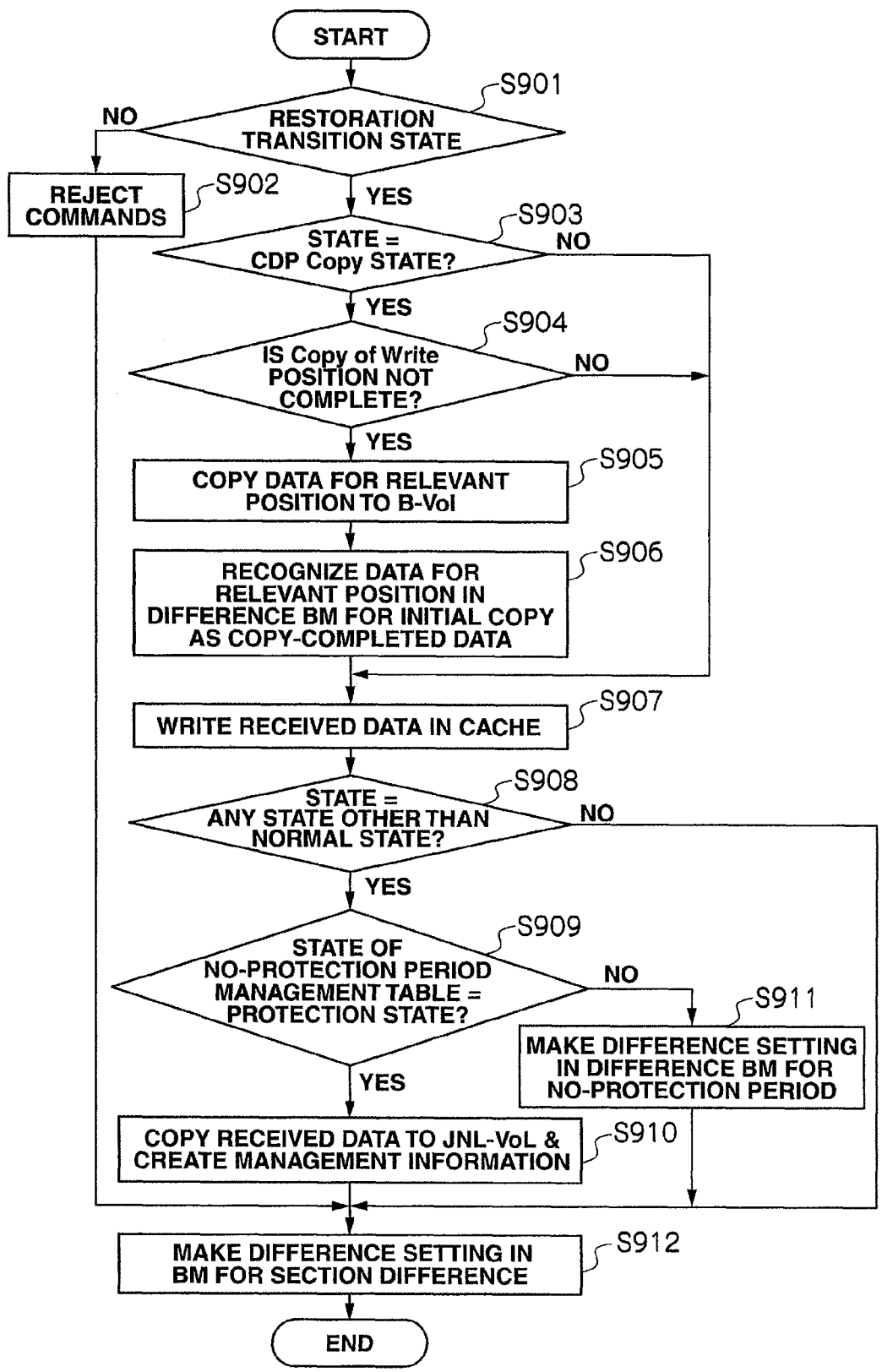
FIG. 29 is a flowchart showing processing upon receipt of write data according to the invention.

FIG. 29 is a flowchart showing the processing at the time the channel adapter 105 receives the write data from the host 10. The processing is started when the channel adapter 105 receives the write data. Note that FIG. 29 illustrates the CDP processing, regarding the CDP processing explained with reference to FIG. 24, executed for the case where a no-protection period is provided in the protection period.

First, the channel adapter 105 judges whether or not the processing is in the restoration transition state (S901). This judgment is made based on the setting in the state column 1011A of the state management table 1011. If the channel adapter 105 determines that the processing is not in the restoration transition state, i.e., if any numerical other than "3" is set in the state column 1011A (S901: NO), the channel adapter 105 rejects commands (S902).

On the other hand, if the channel adapter 105 determines that the processing is in the restoration transition state (901: YES), i.e., where "3" is set in the state column 1011A, the channel adapter 105 judges whether or not the processing is in the CDP copy state (S903). This judgment is made based on the setting in the state column 1011A of the state management table 1011.

If the channel adapter 105 determines that the processing is in the CDP copy state, i.e., where "1" is set in the state column 1011A (S903: YES), the channel adapter 105 judges whether or not the copying of the write position of the write data is incomplete (S904).

If the channel adapter 105 determines that the copying of the write position of the write data is incomplete (S904: YES), the channel adapter 105 copies the data for the relevant position to the base volume 140 (S905). Then, the channel adapter 105 recognizes the data for the relevant position in the difference bitmap 153 for initial copy as copy-completed data (S906).

If the channel adapter 105 executes the above processing for recognizing the data as copy-completed data; the channel adapter 105 determines that the processing is in the CDP copy state at step S903, i.e., any numeral other than "3" is set in the state column 1011A (S903: NO); or the copying of the write position is incomplete at step S904 (S904: NO), the channel adapter 105 writes the data it has received (write data received) in the cache 109 (S907). Note that the data received may alternatively be written in the cache 110.

When the write data received at step S907 is written in the cache 109, the channel adapter 105 judges whether or not the processing is in any state other than the normal state (S908). This judgment is made based on the setting in the state column 1011A of the state management table 1011 as in step S901. In other words, if "0" is set in the state column 1011A, the channel adapter 105 determines that the processing is in a normal state, while if any of "1" through "5" is set in the state column 1011A, the channel adapter 105 determines that the processing is not in the normal state.

If it is determined that the processing is in the normal state (S908: YES), the channel adapter 105 judges whether or not the no-protection period management table 1012 is in the protection state (S909). In other words, the channel adapter 105 judges whether or not "0" is set in the state column 1012A of the management table 1012. The channel adapter 105 determines that the processing is in the protection state if "0" is set in the state column 1012A, while the channel adapter 105 determines that the processing is in the non-protection state if "1" is set in the state column 1012A instead of "0".

If the channel adapter 105 determines that the processing is in the protection state, i.e., where "0" is set in the state column 1012A (S909: YES), the channel adapter 105 copies the received data to the journal volume 130, and creates management information (S910). On the other hand, if the channel adapter 105 determines that the processing is not in the protection state, i.e., where "1" is set in the state column 1012A (S909: NO), the channel adapter 105 sets difference in the difference bitmap 155 for non-protection state (S911).

After the channel adapter 105 terminates the processing at step S902, S910, or S911, or if it is determined that the processing is in any state other than the normal state or that the processing is in the normal state, the channel adapter 105 sets the difference in the bitmap 151 for section difference (S912).

Figure 20:
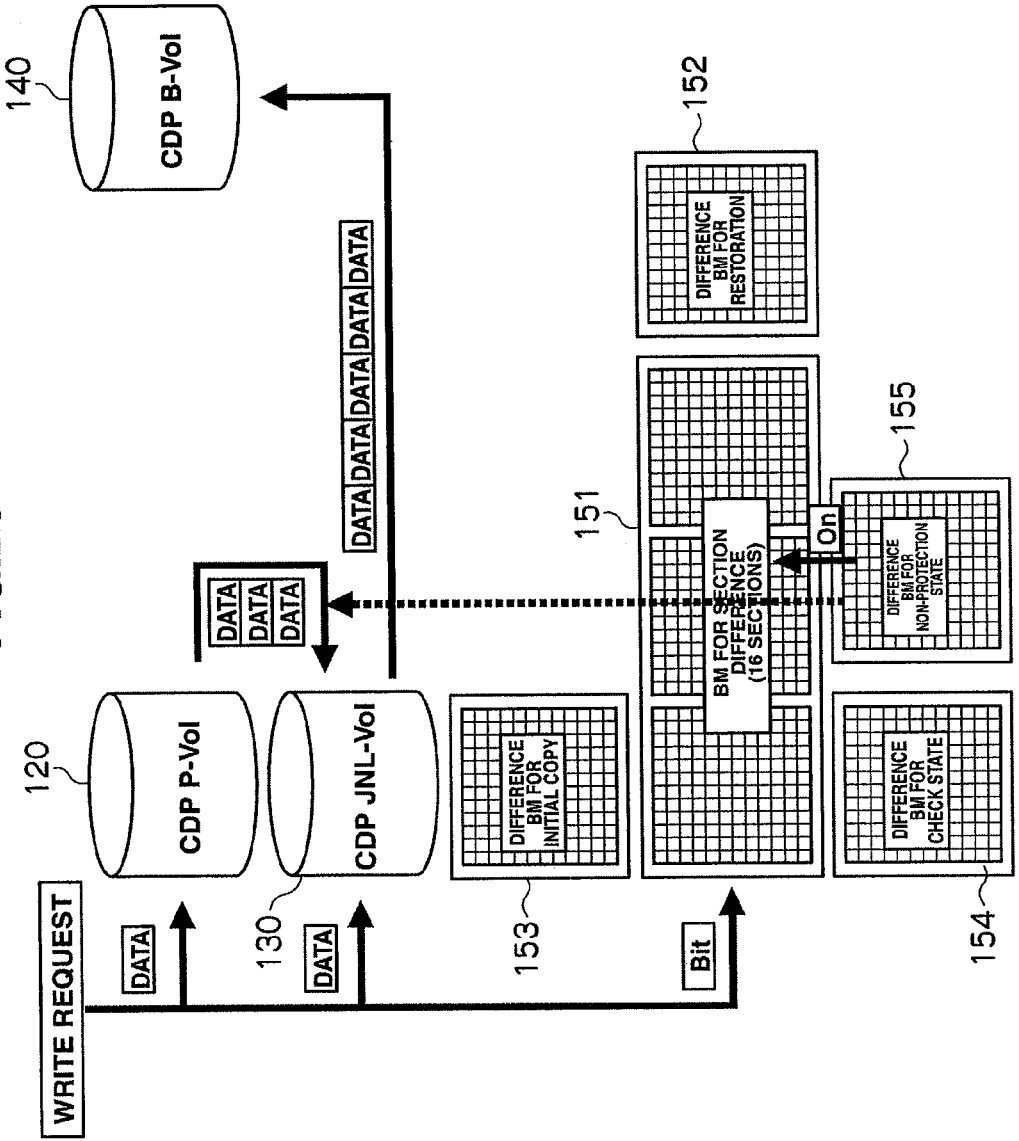
FIG. 20 is a diagram illustrating switching processing from the operation in a no-protection period to the operation in a protection period in CDP processing according to the invention.

FIG. 20 is a diagram illustrating switching from the operation in the no-protection period to the operation in the protection period. At the time of switching to the operation in the protection period, the difference bitmap 155 for non-protection state is integrated into the bitmap 151 for section difference. Then, the journal data is created from the primary volume 120 based on the difference bitmap 155 for non-protection state. Also, the journal data for which the protection period has expired is upgraded from the journal volume 130 to the base volume 140.

Figure 21:
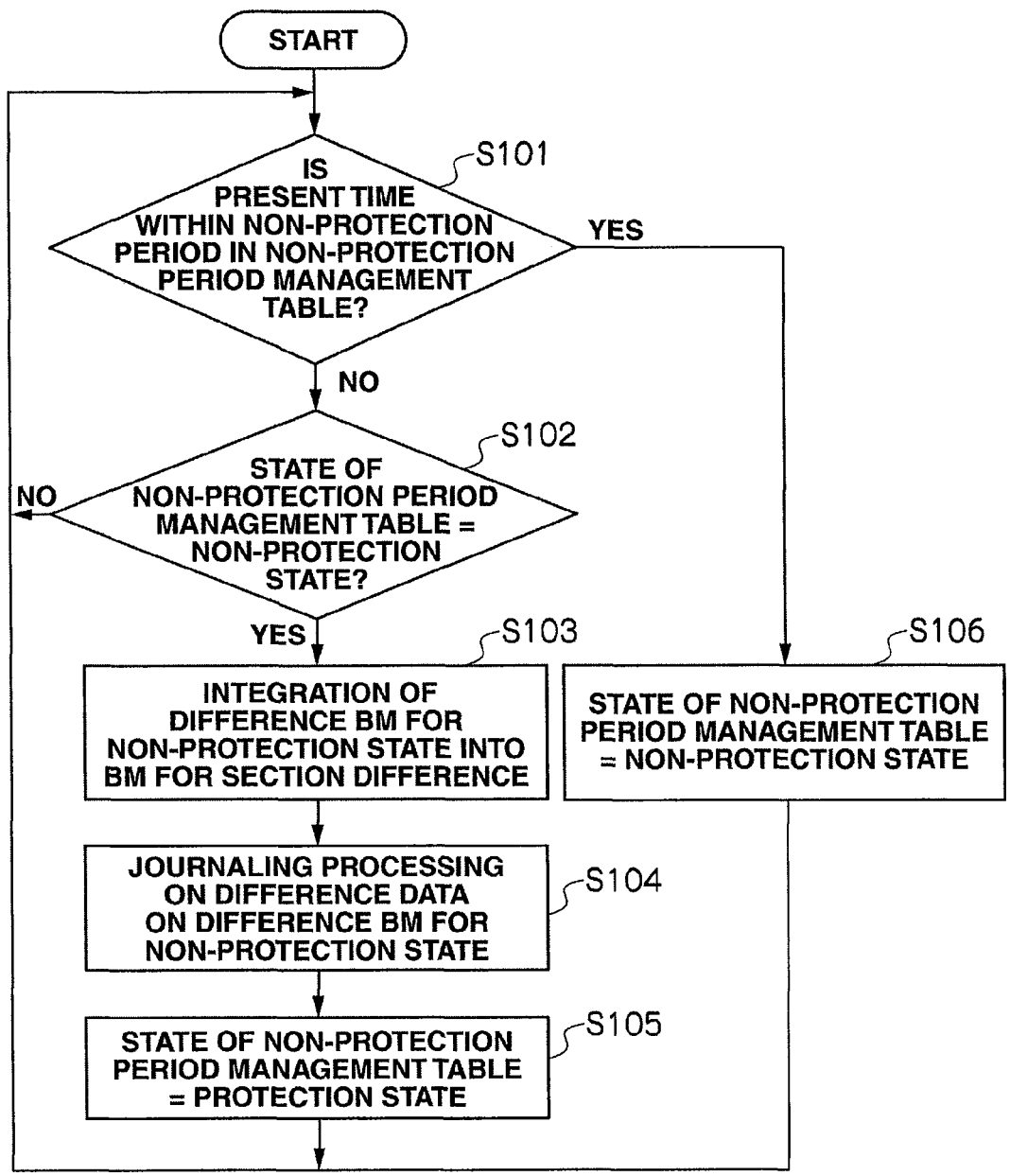
FIG. 21 is a flowchart showing switching processing from the operation in a no-protection period to the operation in a protection period in CDP processing according to the invention.

FIG. 21 is a flowchart showing the processing for switching from the operation in the no-protection period to the operation in the protection period. The processing is activated when the storage apparatus 100 is started up. Note that the processing may be executed by the channel adapter 106.

For example, when a user starts the storage apparatus 100 up, the channel adapter 105 judges whether or not the present time is within the no-protection period set in the no-protection period management table 1012 (S101). If it is determined that the time is not within the no-protection period (S101: NO), the channel adapter 105 judges whether or not the processing is in the non-protection state (S102). This judgment is made based on whether or not "1" is set in the state column 1012A of the no-protection period management table 1012.

If the channel adapter 105 determines that the processing is in the non-protection state, i.e., where "1" is set in the state column 1012A of the no-protection period management table 1012 (S102: YES), the channel adapter 105 integrates the difference bitmap 155 for non-protection state into the bitmap 151 for section difference (S103). Then, the channel adapter 105 executes journaling processing for the difference data on the difference bitmap 155 for non-protection state (S104).

Subsequently, the channel adapter 105 sets the processing to the protection state (S105), i.e., "0" is set in the state column 1012A of the no-protection period management table 1012. Where the channel adapter 105 sets the processing to the protection state or determines that the no-protection period management table 1012 is not in the non-protection state at step S102 (S102: NO), the channel adapter 105 returns to step S101.

On the other hand, if it is determined that the present time is within the no-protection period (S101: YES), the channel adapter 105 sets the processing in the non-protection state (S106), i.e., "1" is set in the state column 1012A of the no-protection period management table 1012. When the processing is set to the non-protection state as described above, the channel adapter 105 returns to step S101. As described above, monitoring processing for the protection period is executed.

Figure 32:
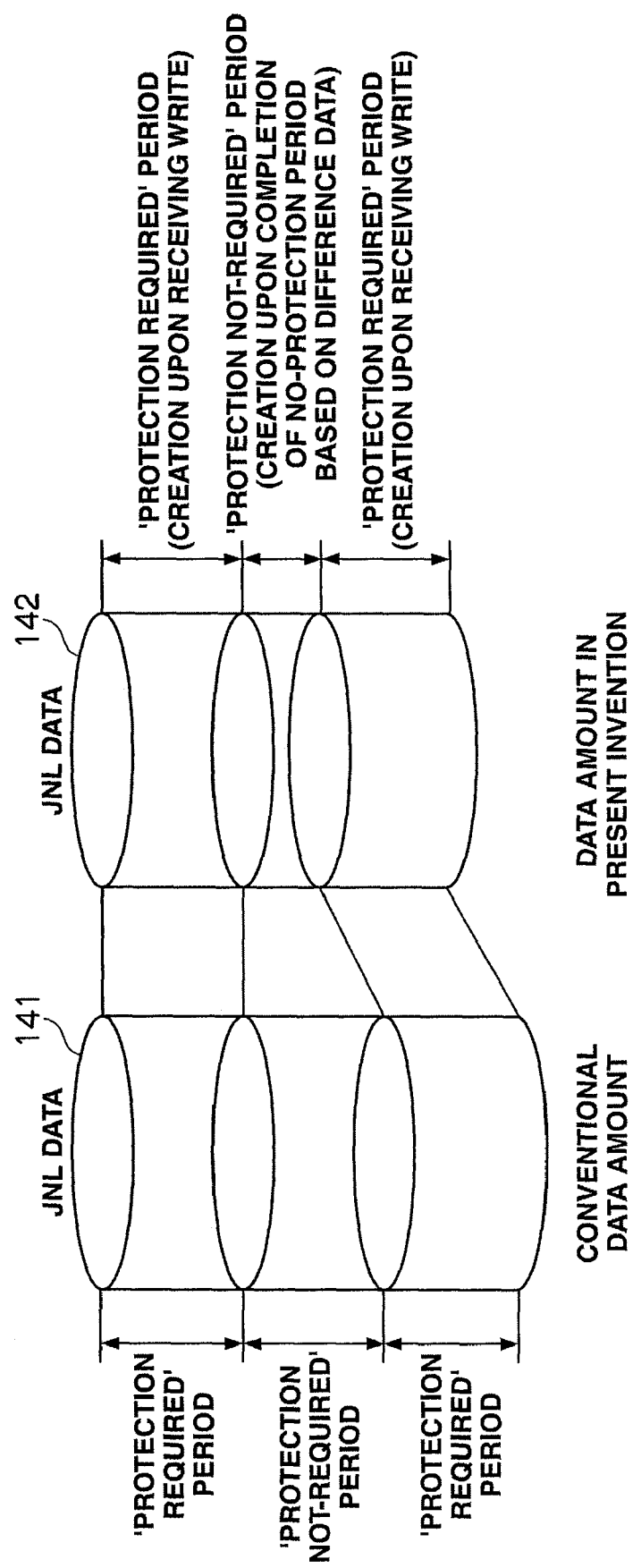
FIG. 32 is a diagram schematically illustrating the difference in stored data amount between conventional CDP processing and CDP processing that utilizes the invention.

FIG. 32 is a diagram schematically illustrating the difference in storage data amount between conventional CDP processing and the CDP processing that utilizes this invention. In FIG. 32, journal data 141 indicates the data amount in conventional CDP processing, and journal data 142 indicates the data amount in CDP processing that utilizes the invention. Also in FIG. 32, a 'protection not-required' period, during which no data protection is needed, is provided between 'protection required' periods, during which data protection is needed, showing the difference in data amount between the conventional CDP processing and CDP processing that utilizes the invention. Incidentally, the data in the 'protection required' period is the data created at the time the write data is received, and the data in the 'protection not-required' period is the data created from the difference data at the time of termination of the no-protection period.

In conventional CDP processing, journal data needs to be stored without distinguishing between the protection period and the no-protection period. On the other hand, in CDP processing that utilizes the invention, concerning the no-protection period, it is sufficient that the data, which is created from the difference data at the end of the period, be stored. Therefore, according to the invention, the amount of data stored in the no-protection period can be reduced, as shown in FIG. 32.

Figure 33:
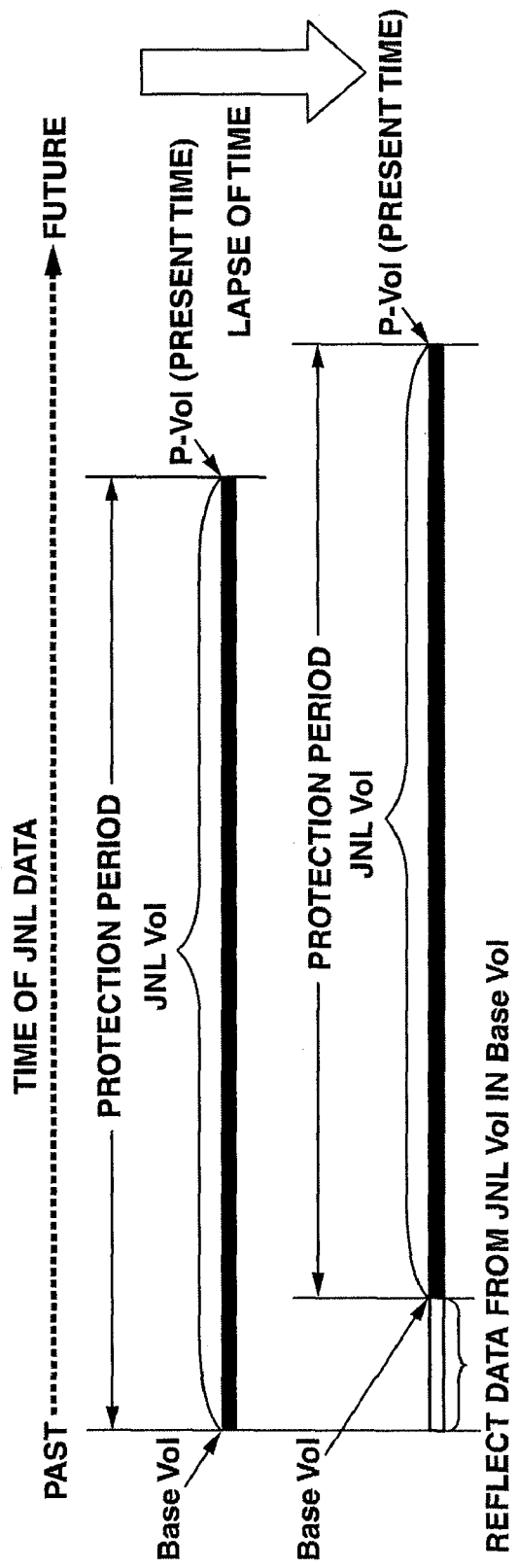
FIG. 33 is a diagram showing the stored state of write data on a primary volume, a journal volume, and a base volume and the time-lapse transition of the stored state in conventional CDP processing.
Figure 34:
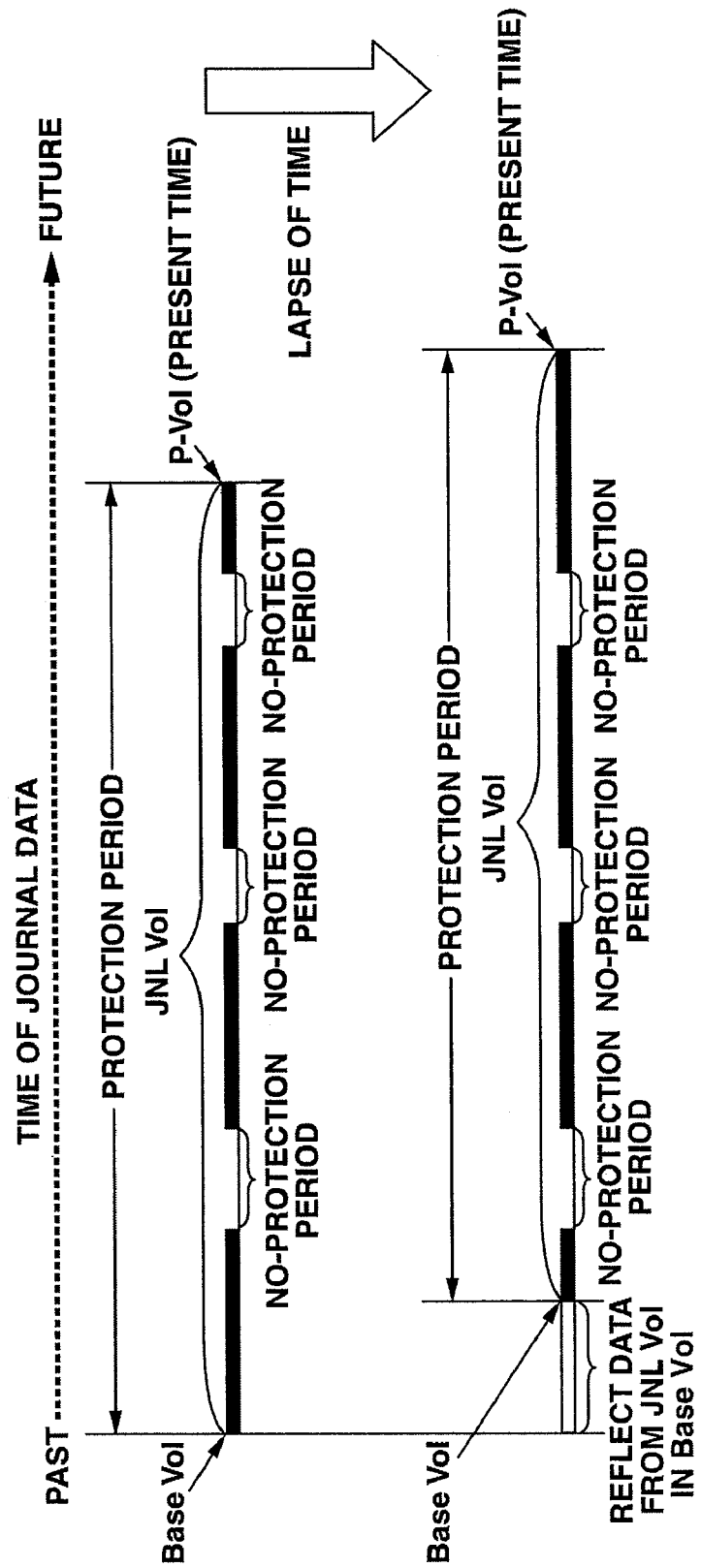
FIG. 34 is a diagram showing the stored state of write data on a primary volume, a journal volume, and a base volume and the time-lapse transition of the stored state in CDP processing according to the invention.

FIGS. 33 and 34 are each diagrams schematically illustrating the difference in journal data time between conventional CDP processing and CDP processing that utilizes the invention. FIG. 33 shows the journal data time in conventional CDP processing, and FIG. 34 shows the journal data time in CDP processing that utilizes the invention.

FIG. 33 shows the storage state of write data in the primary volume 120, journal volume 130, and base volume 140 and the time-lapse transition of the storage state in conventional CDP processing.

FIG. 34 shows the storage state of write data in the primary volume 120, journal volume 130, and base volume 140 and the time-lapse transition of the storage state in CDP processing that utilizes the invention.

Figure 35:
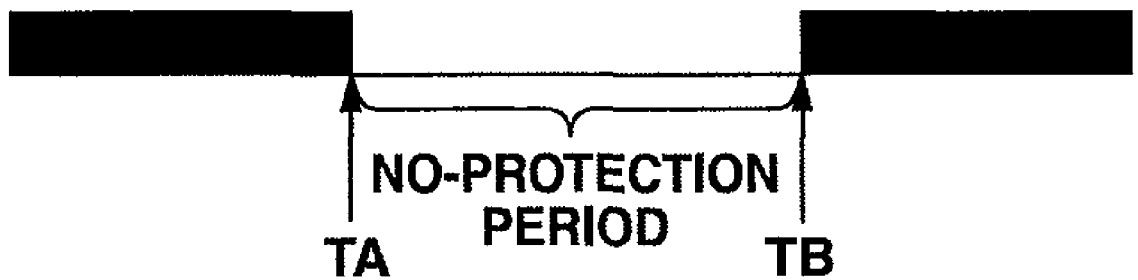
FIG. 35 is an enlarged diagram of the sections either side of a no-protection period according to the invention.

FIG. 35 is an enlarged view of the sections either side of a no-protection period. The time at the start of the no-protection period is designated as time TA, and the time at the end is designated as time TB. The write data received during the period from the time TA to the time TB is subjected to difference management, and the resultant write data is managed as the write data received at the time TB for journal data at the end of the no-protection period.

Figure 36:
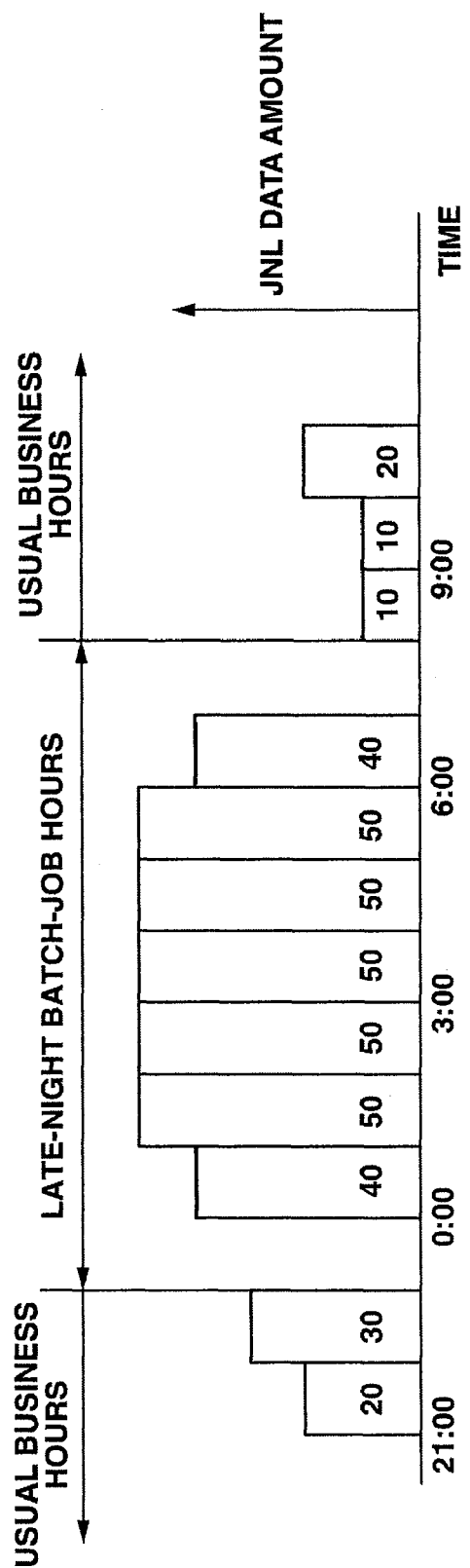
FIG. 36 is a diagram showing the amount of journal data in conventional CDP processing.
Figure 37:
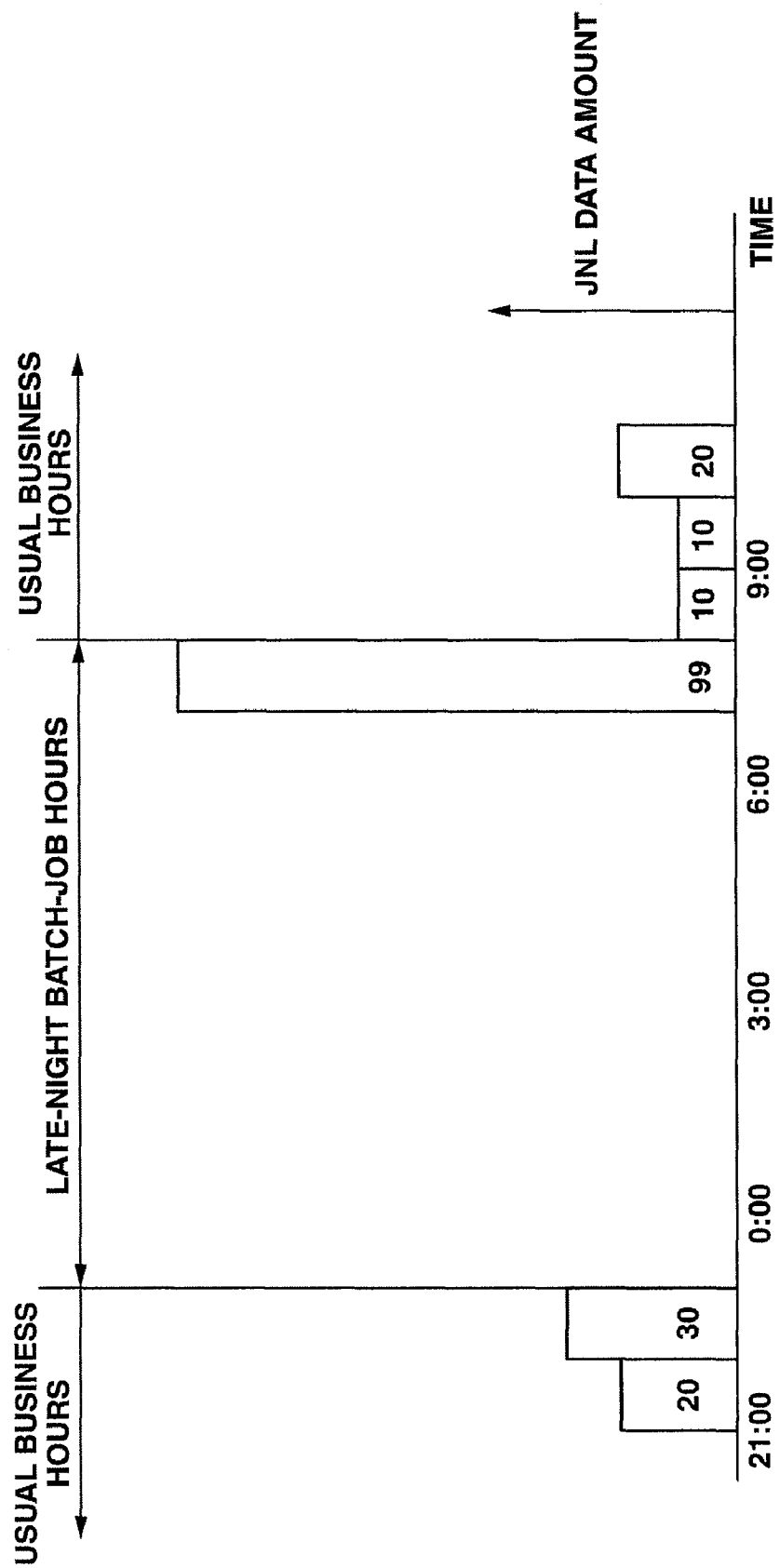
FIG. 37 is a diagram showing the amount of journal data in CDP processing according to the invention.

FIGS. 36 and 37 each show an example of the difference in journal data amount between conventional CDP processing and CDP processing that utilizes the invention. FIG. 36 shows the journal data amount in conventional CDP processing, and FIG. 37 shows the journal data amount in CDP processing that utilizes the invention.

A specific example is described where the hours during which usual business takes place (usual business hours) and the hours during which batch processing is executed late at night based on the data obtained in the regular work (late-night batch-job hours), are set in the storage apparatus 100, and so the usual business hours and the late-night batch-job hours are alternately repeated in the storage apparatus 100. Note that the height of the bar graph indicates the amount "GB" of journal data.

As shown in FIG. 36, all the journal data, which is obtained through the batch processing executed in the late-night batch-job hours, is stored in conventional CDP processing. Journal data of 330 GB is stored during the period from the start time (0:00) of the batch processing to the finish time (approximately 7:00).

However, the importance of the batch processing, etc., for the data currently being processed is low. So this invention is utilized for the case where the late-night batch-job hours (0:00 to 7:00), which are originally included in the protection period and are sandwiched between the usual business hours, are set as the no-protection period. In that case, as shown in FIG. 37, only 99 GB of journal data needs to be stored in the journal volume in the late-night batch-job hours. The reduction in the amount of journal data is, assuming total data of 330 GB (40 GB+50 GB+50 GB+50 GB+50 GB+50 GB+40 GB) in the late-night batch-job hours, which was obtained when the hours were included in the protection period, × a 70% overwrite rate, 231 GB. Therefore, the amount of data actually stored in the journal volume 130 is 99 GB, which is obtained by subtracting 231 GB from 330 GB. In other words, compared to conventional CDP processing, the amount of data stored in the journal volume 130 can be reduced by 231 GB using CDP processing that utilizes the invention.

According to the above embodiment, the storage apparatus 100 is provided with the function of setting the no-protection period as the hours during which restoration is unnecessary, control is made so that, without storing the write data as needed in the no-protection period, the difference write data between the start time and the finish time in the relevant period is stored. As a result, the capacity of the write data stored where write data is repeatedly created in the same area in the no-protection period can be reduced. Moreover, backup of the data, that does not need to be restored can be prevented, and also, the reduction of the backup data amount and effective utilization of the storage area of the volume can be realized.

Upon receiving the command for restoring the primary volume 120 in the no-protection period within the protection period from the SVP 11, the primary volume 120 can be restored to its state as of at the specified time by using the journal volume 130 and the base volume 140.

Figure 31:
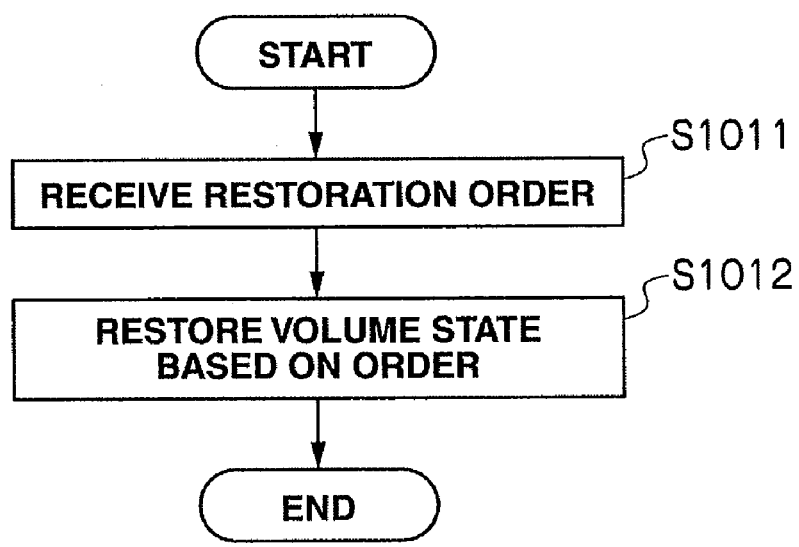
FIG. 31 is a flowchart showing the CDP function-based restoring processing according to the invention.

FIG. 31 is a flowchart showing CDP function-based restoration processing. Upon receiving the command for restoring the primary volume 120 to its state as of at a predetermined time (S1011), the channel adapter 105 follows the data back to the specified time by using the data stored in the journal data stored in the journal volume 130 and the data stored in the base volume 140, and restores the primary volume 120 to its state as of at the specified time (S1012).

At this point, the amount of data stored in the journal volume 130 is less than the conventional amount, so the restoration of the state of the primary volume 120 can be conducted in a small amount of time compared with the conventional time taken. That is, shortening of the volume restoration period can be reduced.

Note that the above embodiment has been described for the case where the storage apparatus 100 with the FIG. 1 configuration is utilized in the invention. However, this invention is not limited to the above case, and a wide variety of other storage apparatuses can be utilized in the invention.

The above description has been made for the case where the present invention is utilized in the storage apparatus 100 including: the primary volume 120 for storing the data sent from the host 10; the journal volume 130 for backing up the data stored in the primary volume 120; a base volume 140 for storing the data stored in the primary volume 120 for protection only within a predetermined protection period; a state management table 1011 for storing protection period information indicating the predetermined protection period; a no-protection period management table 1012 for storing no-protection period information indicating a no-protection period, during which backup to the journal volume 130 is suspended, in the predetermined protection period; and a channel adapter 105 for conducting, in the protection period during which CDP processing is executed, data protection processing for protecting, in the base volume 140, the data stored in the primary volume 120 by using backup data stored in the journal volume 130, and conducting, in the no-protection period within the protection period during which CDP processing is executed, data non-protection processing for suspending the data protection processing, and upon receiving a command, from the host 10, for restoring the primary volume 120 to its state as of at a time not in the no-protection period within the protection period, restoring the primary volume 120 to its state as of at a time of the order by using the data backed up in the journal volume 130 and the data protected in the base volume 140. However, other storage apparatuses can be utilized in the invention.

Incidentally, the data protection processing is processing in which, the bitmap 151 for section difference including, e.g., 16 sections, which are provided for periods (e.g., 14 periods) obtained by dividing the protection period on a predetermined-time basis and in which a bit corresponds to a track that stores the data in the data storage area of the primary volume 120, is switched depending on the relevant divided period to perform backup of the data stored in the primary volume 120; and the data non-protection processing is processing in which backup of the data stored in the primary volume 120 is conducted using the difference bitmap 155 for non-protection state, which is provided in the no-protection period and in which a bit corresponds to a track that stores the data in the data storage area of the primary volume 120, instead of using the bitmap 151 for section difference. Also, the data backed up by using the difference bitmap 155 for non-protection state is integrated into the latest section in the bitmap 151 for section difference at the time of termination of the no-protection period. While a description has been made for the above case, the invention is not limited to that embodiment.

What is claimed is:

1. A storage apparatus comprising:
a first logical volume for storing data sent from a host system;
a second logical volume for backing up the data stored in the first logical volume;
a third logical volume for storing the data stored in the first logical volume for protection only within a predetermined protection period;
a first storage unit for storing protection period information indicating the predetermined protection period;
a second storage unit for storing no-protection period information indicating a no-protection period, during which backup to the second logical volume is suspended, in the predetermined protection period; and
a control unit,
wherein during the protection period, the control unit performs data protection by storing, in the third logical volume, the data stored in the first logical volume by using backup data stored in the second logical volume,
wherein during the no-protection period, which is ordered within the protection period, the control unit suspends the data protection, and
wherein upon receiving an external command for restoring the first logical volume to a state of the first logical volume as of a time not in the no-protection period, restoring the first logical volume to the state of the first logical volume as of a time at which the no-protection period was ordered by using the backup data stored in the second logical volume and the data stored in the third logical volume.

2. The storage apparatus according to claim 1, wherein the type of data protection performed is continuous data protection.

3. The storage apparatus according to claim 1,
wherein the protection period is divided into a plurality of periods,
wherein a bitmap group includes a plurality of first bitmaps, each first bitmap corresponding to a period of the plurality of periods, and each bit of each first bitmap corresponding to a track that stores the data in a data storage area in the first logical volume,
wherein during the data protection, backup of the data stored in the first logical volume is performed by switching at least one of the first bitmaps depending on the relevant divided period, and
wherein during the no-protection period, backup of the data stored in the first logical volume is performed by using a second bitmap, which is provided in the no-protection period, each bit of the second bitmap corresponding to a track that stores the data in the data storage area in the first logical volume.

4. The storage apparatus according to claim 3, wherein, at a time of termination of the no-protection period, the data backed up by using the second bitmap is integrated into a first bitmap corresponding to a relevant period.

5. The storage apparatus according to claim 1, wherein the no-protection period information is set via a connected maintenance terminal apparatus or sent from the host system.

6. A data restoration method for a storage apparatus including: a first logical volume for storing data sent from a host system; a second logical volume for backing up the data stored in the first logical volume; a third logical volume for storing the data stored in the first logical volume for protection only within a predetermined protection period, the data restoration method comprising the steps of:
performing, in the protection period, data protection by storing, in the third logical volume, the data stored in the first logical volume by using backup data stored in the second logical volume;
suspending, during a no-protection period, which is ordered within the protection period, the data protection relative to the second logical volume; and
upon receiving an external order for restoring the first logical volume to a state of the first logical volume as of time not in the no-protection period, restoring the first logical volume to the state of the first logical volume as of a time at which the no-protection period was ordered by using the backup data stored in the second logical volume and the data stored in the third logical volume.

7. The data restoration method for a storage apparatus according to claim 6, wherein the type of data protection is continuous data protection processing.

8. The data restoration method according to claim 6,
wherein the protection period is divided into a plurality of periods,
wherein a bitmap group includes a plurality of first bitmaps, each first bitmap corresponding to a period of the plurality of periods, and each bit of each first bitmap corresponding to a track that stores the data in a data storage area in the first logical volume,
wherein during the data protection, backup of the data stored in the first logical volume is performed by switching at least one of the first bitmaps depending on the relevant period, and
wherein during the no-protection period backup of the data stored in the first logical volume is performed by using a second bitmap, which is provided in the no-protection period, each bit of the second bitmap corresponding to a track that stores the data in the data storage area in the first logical volume.

9. The data restoration method for a storage apparatus according to claim 8, further comprising the step of:
at the time of termination of the no-protection period, integrating the data backed up by using the second bitmap into a first bitmap corresponding to a relevant period.

10. The data restoration method for a storage apparatus according to claim 6, wherein the no-protection period information is set by a connected maintenance terminal apparatus or sent from the host system.

* * * * *